(12) United States Patent
Cornett et al.

(10) Patent No.: US 10,768,841 B2
(45) Date of Patent: Sep. 8, 2020

(54) TECHNOLOGIES FOR MANAGING NETWORK STATISTIC COUNTERS

(71) Applicant: Intel Corporation, Santa Clara, CA (US)

(72) Inventors: Linden Cornett, Portland, OR (US); Chih-Jen Chang, Union City, CA (US); Manasi Deval, Portland, OR (US); Parthasarathy Sarangam, Portland, OR (US); Naru D. Sundar, Los Gatos, CA (US); Padma Akkiraju, Fremont, CA (US); Alexander Nguyen, Canoga Park, CA (US)

(73) Assignee: Intel Corporation, Santa Clara, CA (US)

(*) Notice: Subject to any disclaimer, the term of this patent is extended or adjusted under 35 U.S.C. 154(b) by 331 days.

(21) Appl. No.: 15/721,817

(22) Filed: Sep. 30, 2017

(65) Prior Publication Data

US 2018/0152366 A1 May 31, 2018

Related U.S. Application Data

(60) Provisional application No. 62/427,268, filed on Nov. 29, 2016.

(30) Foreign Application Priority Data

Aug. 30, 2017 (IN) .............................. 201741030632

(51) Int. Cl.
*G06F 15/173* (2006.01)
*G06F 3/06* (2006.01)
(Continued)

(52) U.S. Cl.
CPC .......... *G06F 3/0641* (2013.01); *G06F 3/0604* (2013.01); *G06F 3/065* (2013.01);
(Continued)

(58) Field of Classification Search
CPC .. G06F 3/0641; G06F 11/3079; G06F 9/5005; G06F 16/1744; G06F 8/65;
(Continued)

(56) References Cited

U.S. PATENT DOCUMENTS

| | | | | |
|---|---|---|---|---|
| 2006/0129705 A1* | 6/2006 | Hayasaka | ............... | G06F 13/24 710/15 |
| 2014/0237192 A1* | 8/2014 | Liu | ..................... | G06F 11/3471 711/135 |
| 2016/0359947 A1* | 12/2016 | Rao | ....................... | H04L 67/025 |

* cited by examiner

*Primary Examiner* — Umar Cheema
*Assistant Examiner* — Anh Nguyen
(74) *Attorney, Agent, or Firm* — Barnes & Thornburg LLP

(57) ABSTRACT

Technologies for managing network statistic counters include a network interface controller (NIC) of a computing device configured to identify a statistic counter of and a software consumer associated with a received network packet and identify an active counter page as a function of the identified software consumer. The NIC is further configured to read a value of the statistic counter stored at a counter memory address of a corresponding counter identifier entry of the identified active counter page, increment a read value of the statistic counter, and write the incremented value of the statistic counter back to the counter memory address. Additionally, in response to detecting a notification triggering event, generating a notification message that includes a present value of the statistic counter and a present value of each of the other statistic counters of the active counter page, and transmit the generated notification message to the software consumer. Other embodiments are described herein.

25 Claims, 16 Drawing Sheets

(51) Int. Cl.

| | | |
|---|---|---|
| G06F 16/174 | (2019.01) | |
| G06F 21/57 | (2013.01) | |
| G06F 21/73 | (2013.01) | |
| G06F 8/65 | (2018.01) | |
| H04L 12/24 | (2006.01) | |
| H04L 29/08 | (2006.01) | |
| G06F 11/30 | (2006.01) | |
| G06F 9/50 | (2006.01) | |
| H03M 7/30 | (2006.01) | |
| H03M 7/40 | (2006.01) | |
| H04L 12/26 | (2006.01) | |
| H04L 12/813 | (2013.01) | |
| H04L 12/851 | (2013.01) | |
| G06F 11/07 | (2006.01) | |
| G06F 11/34 | (2006.01) | |
| G06F 7/06 | (2006.01) | |
| G06T 9/00 | (2006.01) | |
| H03M 7/42 | (2006.01) | |
| H04L 12/28 | (2006.01) | |
| H04L 12/46 | (2006.01) | |
| H04L 29/12 | (2006.01) | |
| G06F 13/16 | (2006.01) | |
| G06F 21/62 | (2013.01) | |
| G06F 21/76 | (2013.01) | |
| H03K 19/173 | (2006.01) | |
| H04L 9/08 | (2006.01) | |
| H04L 12/933 | (2013.01) | |
| G06F 9/38 | (2018.01) | |
| G06F 9/48 | (2006.01) | |
| G06F 12/02 | (2006.01) | |
| G06F 12/06 | (2006.01) | |
| G06T 1/20 | (2006.01) | |
| G06T 1/60 | (2006.01) | |
| G06F 9/54 | (2006.01) | |
| G06F 8/656 | (2018.01) | |
| G06F 8/658 | (2018.01) | |
| G06F 8/654 | (2018.01) | |
| G06F 9/4401 | (2018.01) | |
| H01R 13/453 | (2006.01) | |
| H01R 13/631 | (2006.01) | |
| H05K 7/14 | (2006.01) | |
| H04L 12/911 | (2013.01) | |
| G06F 11/14 | (2006.01) | |
| H04L 29/06 | (2006.01) | |
| G06F 15/80 | (2006.01) | |

(52) U.S. Cl.
CPC ............ *G06F 3/067* (2013.01); *G06F 3/0608* (2013.01); *G06F 3/0611* (2013.01); *G06F 3/0613* (2013.01); *G06F 3/0617* (2013.01); *G06F 3/0647* (2013.01); *G06F 3/0653* (2013.01); *G06F 7/06* (2013.01); *G06F 8/65* (2013.01); *G06F 8/654* (2018.02); *G06F 8/656* (2018.02); *G06F 8/658* (2018.02); *G06F 9/3851* (2013.01); *G06F 9/3891* (2013.01); *G06F 9/4401* (2013.01); *G06F 9/4881* (2013.01); *G06F 9/505* (2013.01); *G06F 9/5005* (2013.01); *G06F 9/5038* (2013.01); *G06F 9/544* (2013.01); *G06F 11/079* (2013.01); *G06F 11/0709* (2013.01); *G06F 11/0751* (2013.01); *G06F 11/3006* (2013.01); *G06F 11/3034* (2013.01); *G06F 11/3055* (2013.01); *G06F 11/3079* (2013.01); *G06F 11/3409* (2013.01); *G06F 12/0284* (2013.01); *G06F 12/0692* (2013.01); *G06F 13/1652* (2013.01); *G06F 16/1744* (2019.01); *G06F 21/57* (2013.01); *G06F 21/6218* (2013.01); *G06F 21/73* (2013.01); *G06F 21/76* (2013.01); *G06T 1/20* (2013.01); *G06T 1/60* (2013.01); *G06T 9/005* (2013.01); *H01R 13/4538* (2013.01); *H01R 13/631* (2013.01); *H03K 19/1731* (2013.01); *H03M 7/3084* (2013.01); *H03M 7/40* (2013.01); *H03M 7/42* (2013.01); *H03M 7/60* (2013.01); *H03M 7/6011* (2013.01); *H03M 7/6017* (2013.01); *H03M 7/6029* (2013.01); *H04L 9/0822* (2013.01); *H04L 12/2881* (2013.01); *H04L 12/4633* (2013.01); *H04L 41/044* (2013.01); *H04L 41/0816* (2013.01); *H04L 41/0853* (2013.01); *H04L 41/12* (2013.01); *H04L 43/04* (2013.01); *H04L 43/06* (2013.01); *H04L 43/08* (2013.01); *H04L 43/0894* (2013.01); *H04L 47/20* (2013.01); *H04L 47/2441* (2013.01); *H04L 49/104* (2013.01); *H04L 61/2007* (2013.01); *H04L 67/10* (2013.01); *H04L 67/1014* (2013.01); *H04L 67/327* (2013.01); *H04L 67/36* (2013.01); *H05K 7/1452* (2013.01); *H05K 7/1487* (2013.01); *G06F 11/1453* (2013.01); *G06F 12/023* (2013.01); *G06F 15/80* (2013.01); *G06F 2212/401* (2013.01); *G06F 2212/402* (2013.01); *G06F 2221/2107* (2013.01); *H04L 41/046* (2013.01); *H04L 41/0896* (2013.01); *H04L 41/142* (2013.01); *H04L 47/78* (2013.01); *H04L 63/1425* (2013.01)

(58) Field of Classification Search
CPC ........ G06F 21/57; G06F 21/73; G06F 3/0608; G06F 3/065; G06F 3/067; G06F 3/0611; G06F 3/0613; G06F 3/0617; G06F 3/0647; G06F 3/0653; G06F 11/0709; G06F 11/0751; G06F 11/079; G06F 11/3006; G06F 11/3409; G06F 7/06; G06F 13/1652; G06F 21/6218; G06F 21/76; G06F 9/3851; G06F 9/4881; G06F 9/505; G06F 12/0284; G06F 12/0692; G06F 9/3891; G06F 9/5038; G06F 9/544; G06F 8/656; G06F 8/658; G06F 8/654; G06F 9/4401; G06F 3/0604; G06F 11/3034; G06F 11/3055; G06F 11/1453; G06F 12/023; G06F 2212/401; G06F 2212/402; G06F 2221/2107; G06F 15/80; H04L 41/0816; H04L 41/0853; H04L 41/12; H04L 67/10; H04L 43/08; H04L 47/20; H04L 47/2441; H04L 12/2881; H04L 12/4633; H04L 61/2007; H04L 9/0822; H04L 41/044; H04L 49/104; H04L 67/327; H04L 67/36; H04L 43/04; H04L 43/06; H04L 43/0894; H04L 67/1014; H04L 47/78; H04L 41/046; H04L 41/0896; H04L 41/142; H04L 63/1425; H03M 7/6017; H03M 7/60; H03M 7/40; H03M 7/6011; H03M 7/6029; H03M 7/3084; H03M 7/42; G06T 9/005; G06T 1/20; G06T 1/60; H03K 19/1731; H01R 13/4538; H01R 13/631; H05K 7/1452; H05K 7/1487
USPC ........................................ 709/224
See application file for complete search history.

TECHNOLOGIES FOR MANAGING NETWORK STATISTIC COUNTERS

CROSS-REFERENCE TO RELATED APPLICATIONS

The present application claims the benefit of U.S. Provisional Patent Application No. 62/427,268, filed Nov. 29, 2016 and Indian Provisional Patent Application No. 201741030632, filed Aug. 30, 2017.

BACKGROUND

In present packet-switched network architectures, data is transmitted in the form of network packets between networked computing devices. At a high level, data is collected and packetized into a network packet, which is then sent to a transmission device (e.g., a network interface controller (NIC) of the respective networked computing device) responsible for dispatching the network packet to a target computing device over a network. Some such networked computing devices maintain statistics of the network traffic received by and/or transmitted from the computing device via a number of network statistic counters. For example, the network statistic counters can be used to track the number of arrivals of a particular network packet type, event, or flow. As such, the value of the statistic counters can be used to monitor performance and/or security of the computing device, as well as influence network management and network traffic engineering decisions.

Typically, network statistic counters are implemented via on-die memory and maintained by hardware. Generally, to obtain the counter values, a software application polls the statistic counters via a register read. However, certain deployment environments, such as those deployment environments in which millions of statistic counters may be required, can result in a large die size, which may effectively render the design unscalable.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
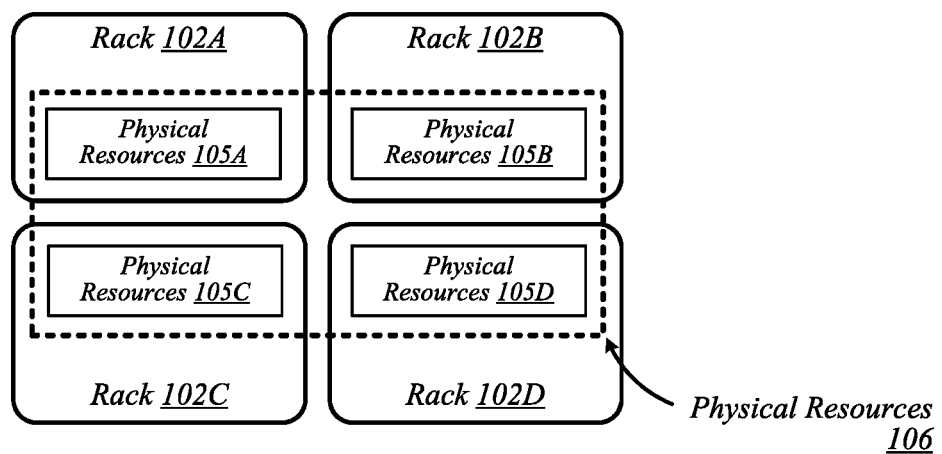
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B);

(C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives utilization information for the various resources, predicts resource utilization for different types of workloads based on past resource utilization, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
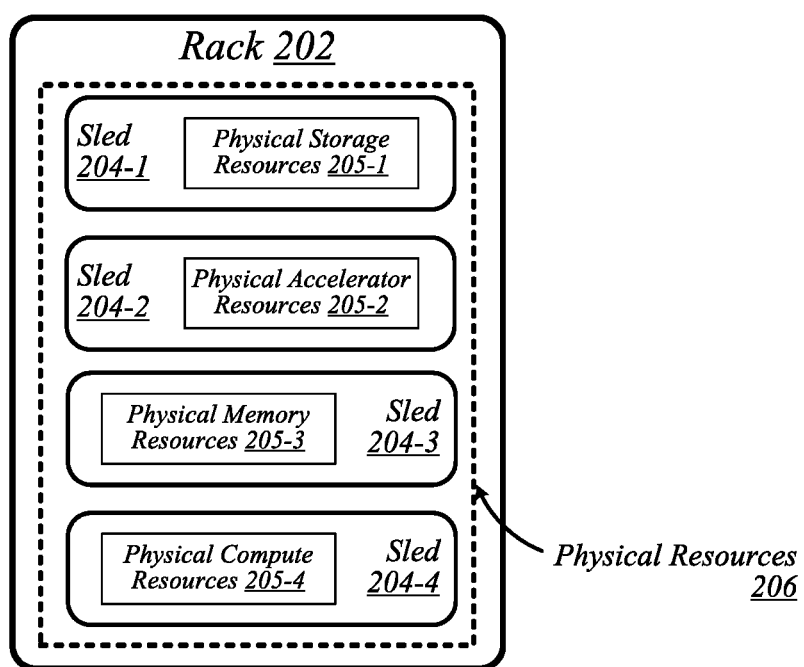
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
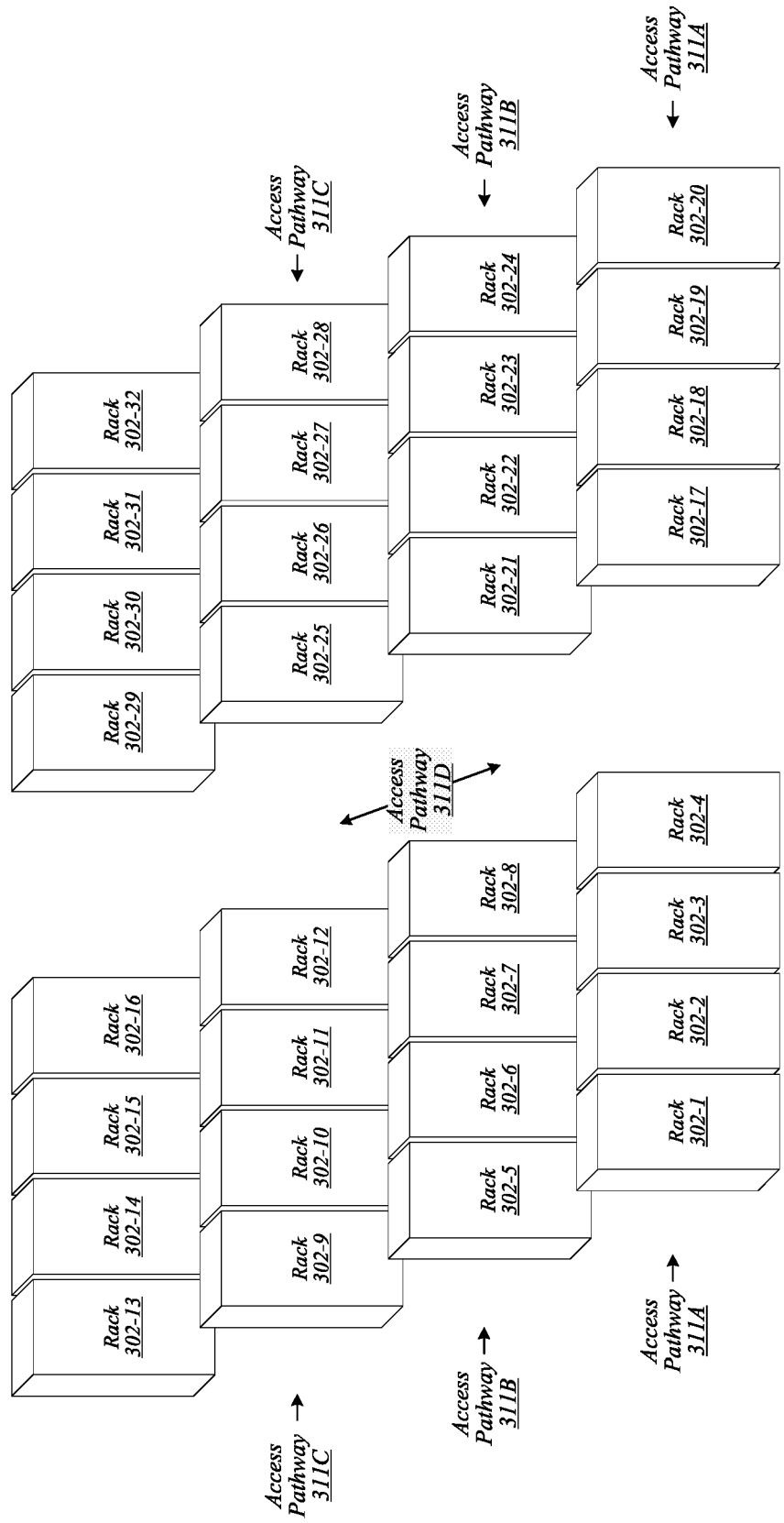
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
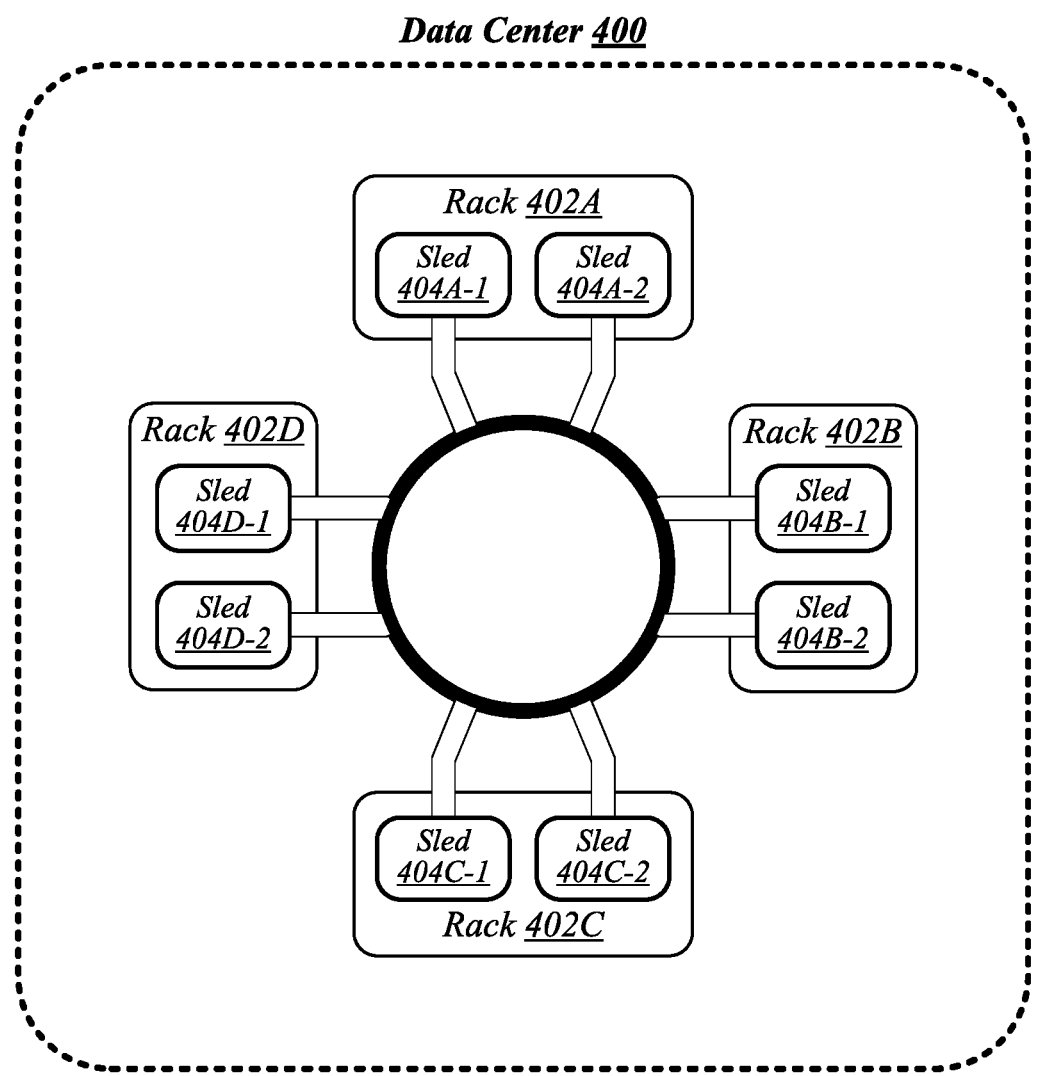
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
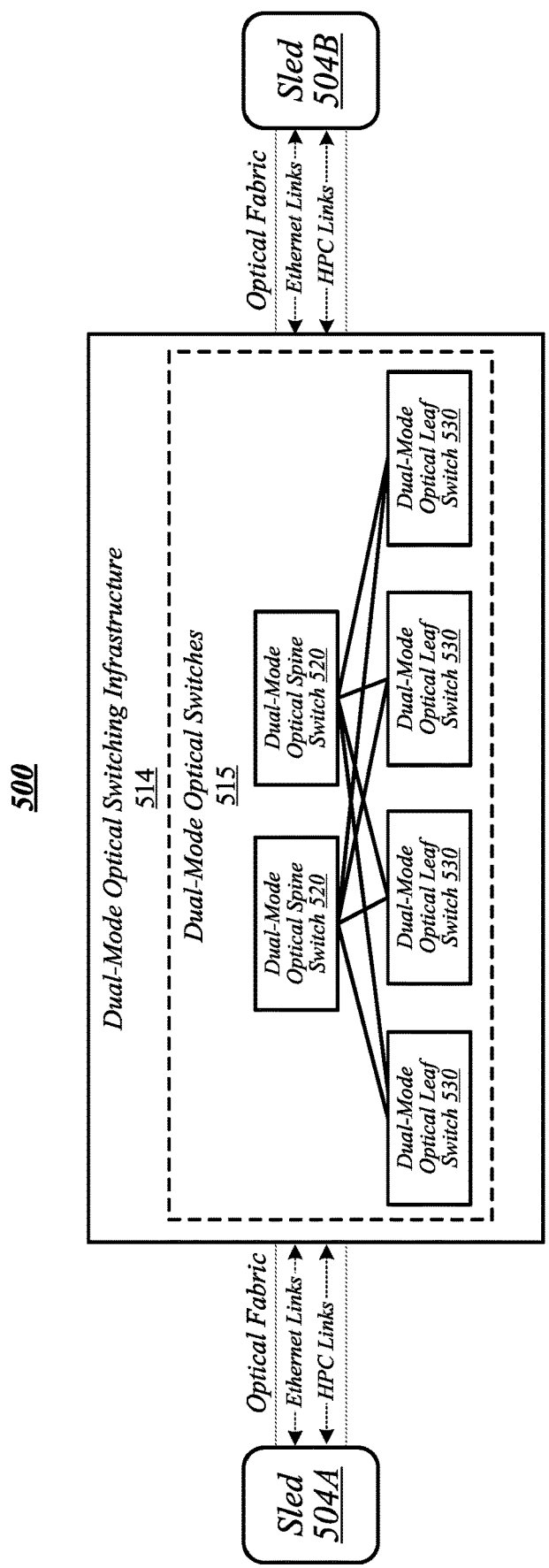
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
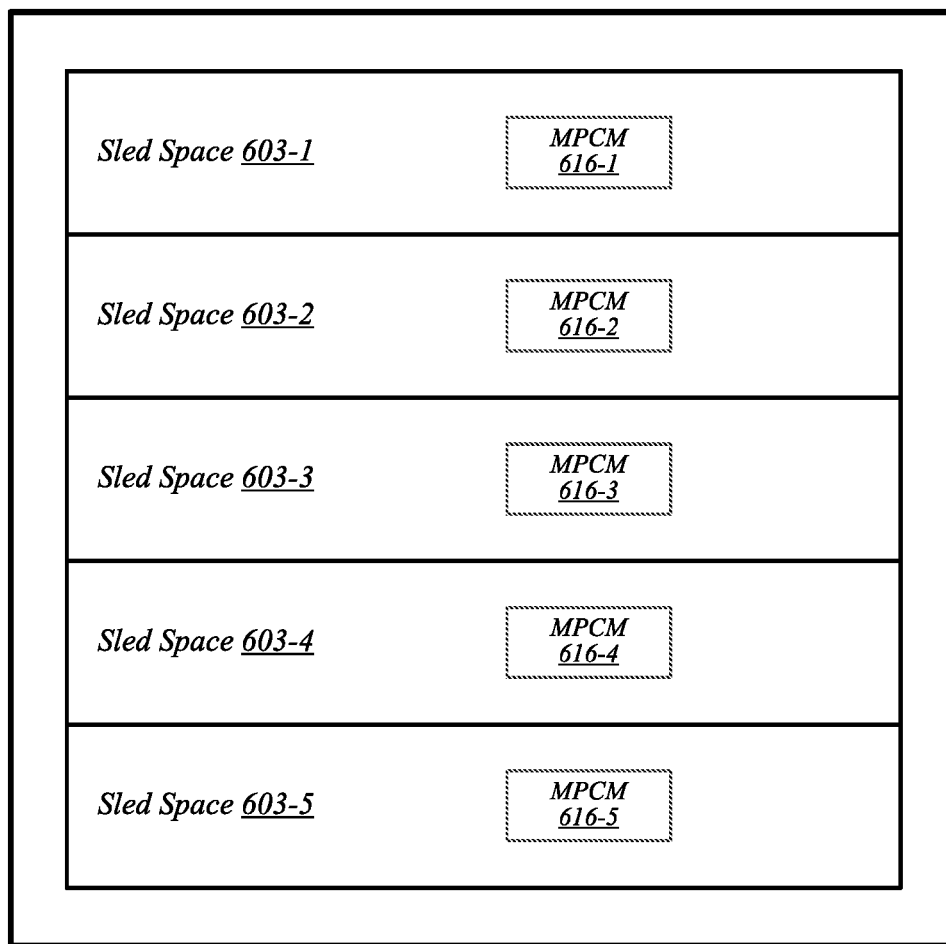
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
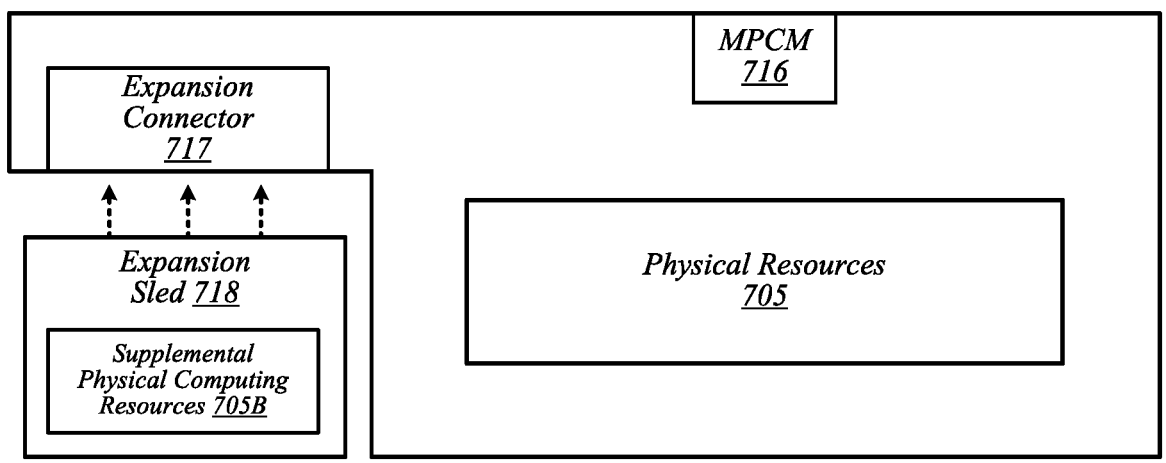
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
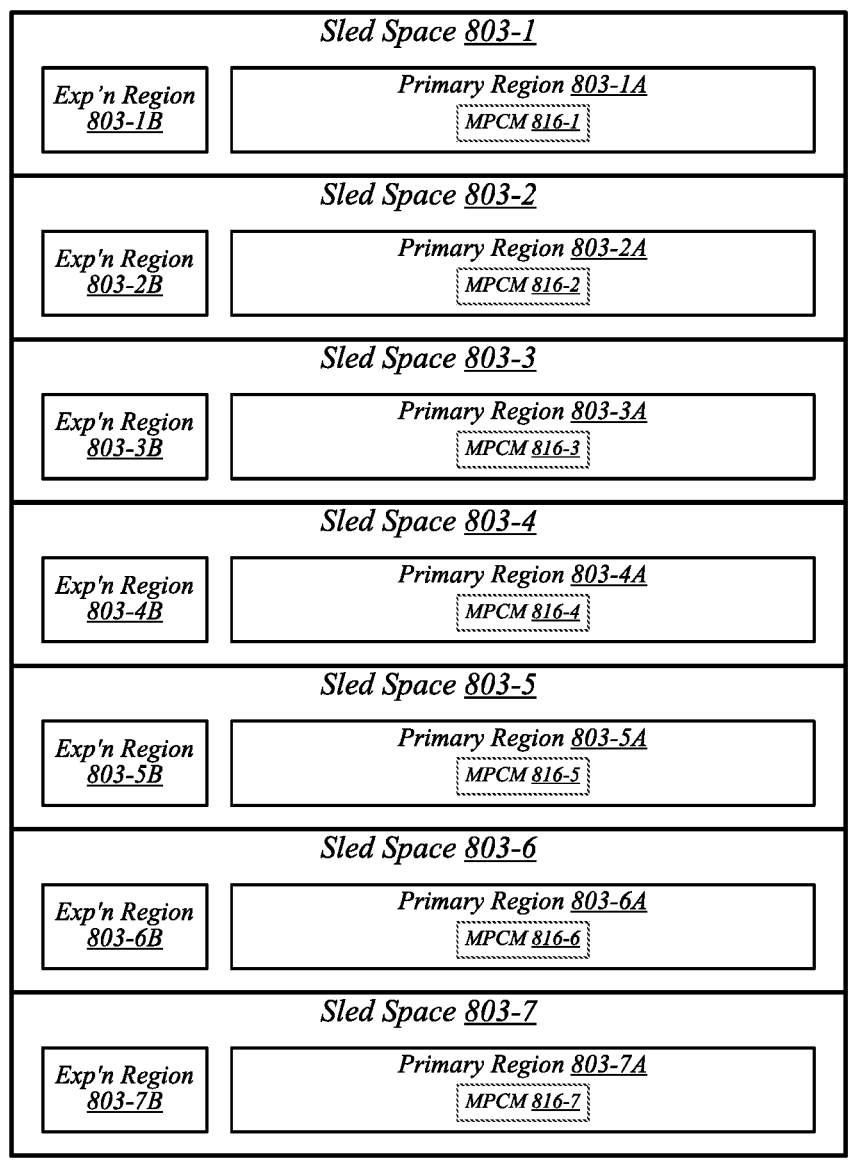
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
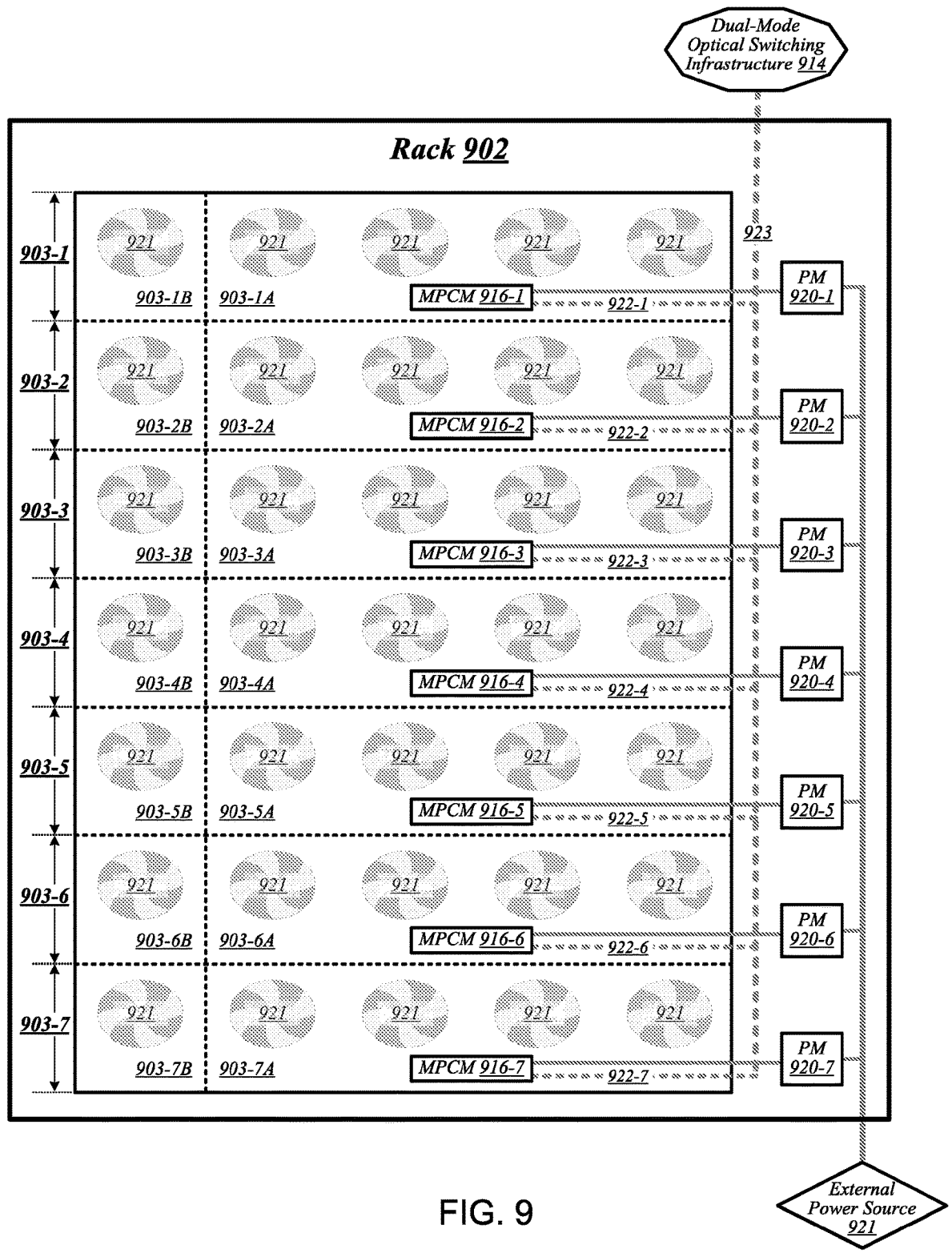
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
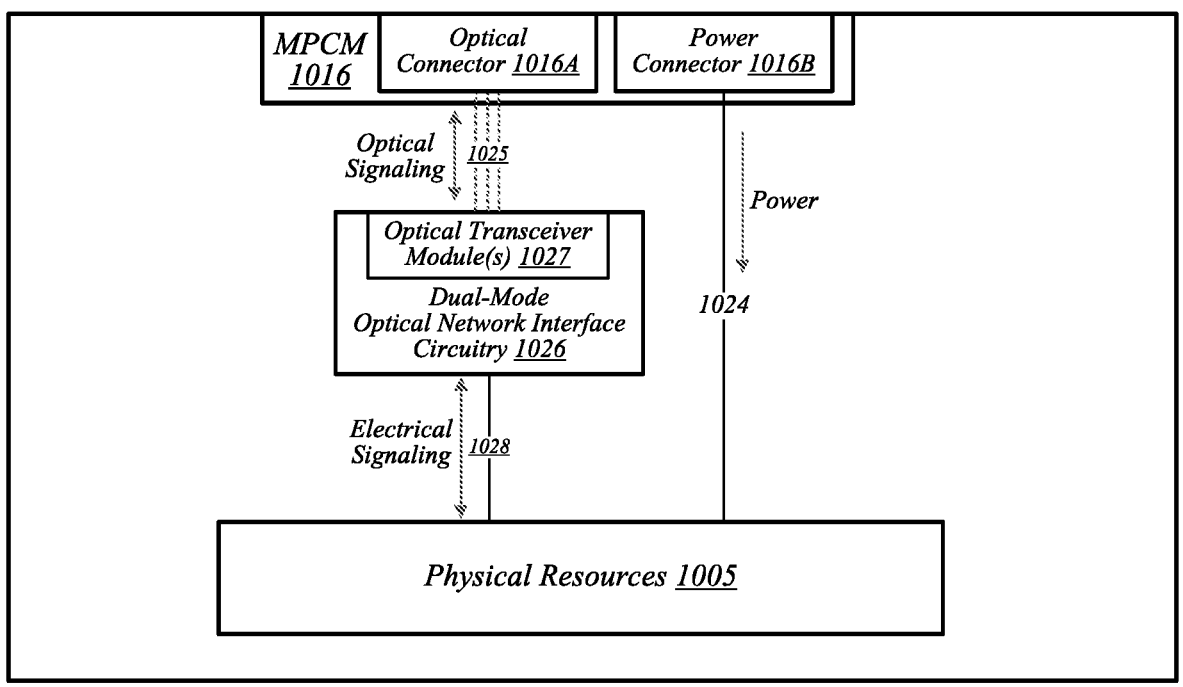
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
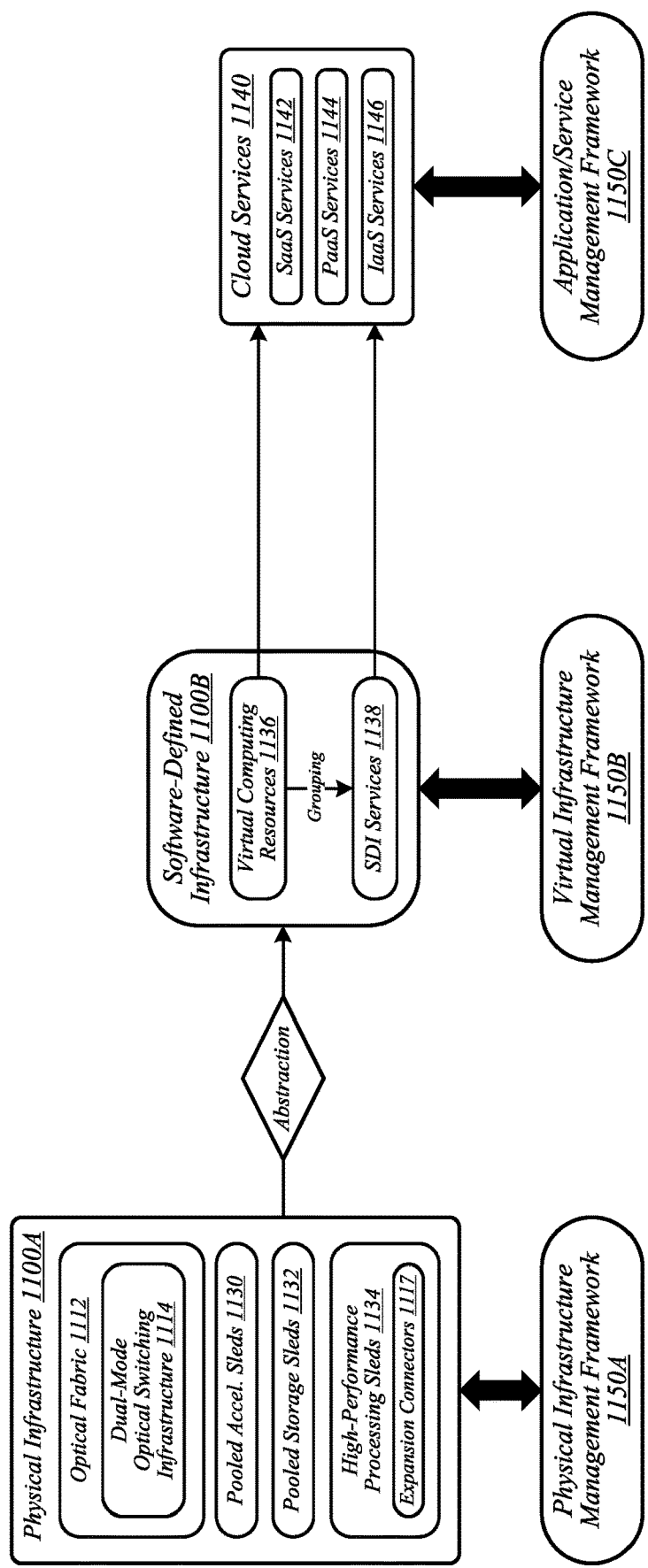
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to— optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
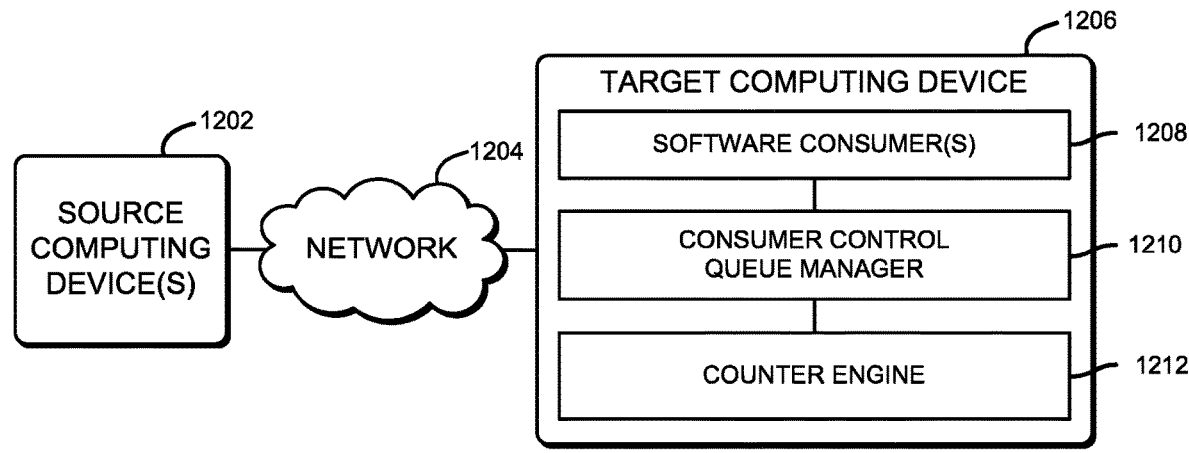
FIG. 12 is a simplified block diagram of at least one embodiment of a system for managing network statistic counters that includes a source computing device communicatively coupled with a target computing device via a network.

Referring now to FIG. 12, in an illustrative embodiment, a system 1200 for managing network statistic counters of a target computing device 1206 (e.g., one of the sleds 204, 404, 504, 1004, 1130, 1132, 1134) includes one or more source computing devices 1202 communicatively coupled to the target computing device 1206 via a network 1204. As illustratively shown, the target computing device 1206 of FIG. 12 includes one or more software consumers 1208, a consumer control queue manager 1210, and a counter engine 1212. In use, the target computing device 1206 manages multiple active counter pages (see, e.g., the active counter pages 1702 of FIG. 17), each of which is usable to track one or more active statistic counters. The active counter pages include statistic counter identifiers usable to lookup the value of corresponding statistic counters (i.e., active statistic counters) which are of interest to the software consumer.

Each active statistic counter is configured to store a value which is indicative of a number of associated network packets that were received over a period of time. Accordingly, a software consumer (e.g., one of the software consumers 1208), such as a software application presently being executed by the target computing device 1206, can subscribe to one or more of the active counter pages and track a certain type of network packets that were received over a period of time. To manage the active counter pages and the statistic counters associated therewith, the target computing device 1206, or more particularly a counter engine (e.g., the counter engine 1212) of the target computing device 1206, is configured to identify a statistic counter which corresponds to a received network packet and increment a value associated with the identified statistic counter upon receipt of the network packet.

Additionally, as described in further detail below, the counter engine 1212 is configured to generate, upon having detected a triggering event, a notification message that includes the statistic counter values of an active counter page to which the software consumer has subscribed. Such triggering events may include a timer having expired, a flush request from the subscribing software, the value of a statistic counter having exceeded a threshold value (e.g., based on a number of bits allocated per counter or other threshold determining factor), a statistic counter having grown by a predetermined value, or some other triggering event. Upon having detected the triggering event, the counter engine 1212 is configured to mark the appropriate active counter page for notification and allocate a new counter page for subsequently received network packets with the applicable statistic counters set to their initial values (e.g., zero). Additionally, the counter engine 1212 is configured to transmit the generated notification message to a subscribed software consumer via a consumer control queue (e.g., the consumer control queue manager 1210). Accordingly, the software consumer can then update a master copy of the statistic counter values.

As such, unlike present techniques, software consumers are not required to poll the counter values from memory located in the hardware and can reply to hardware to provide the notification services. Additionally, as described herein, counter engine 1212 and associated memory buffer is only required to maintain a sufficient set of counters during the notification period, as the master copy of the statistic counter values is maintained by the software, which typically has access to a much larger memory space. Further, since the overall size of the counters is only dependent on maintaining a sufficient set of counters during the notification period, the need to have a large on-die memory can be significantly reduced, thereby allowing scaling to computing systems which may require millions of statistic counters.

The target computing device 1206 may be embodied as any type of computation or computer device capable of performing the functions described herein, including, without limitation, a server (e.g., stand-alone, rack-mounted, blade, etc.), switch (e.g., a disaggregated switch, a rack-mounted switch, a standalone switch, a fully managed switch, a partially managed switch, a full-duplex switch, and/or a half-duplex communication mode enabled switch), a router, a network appliance (e.g., physical or virtual), a web appliance, a distributed computing system, a processor-based system, and/or a multiprocessor system. In an illustrative embodiment, the target computing device 1206 is embodied as a server sled, such as one of the sleds 204, 404, 504, 1004, 1130, 1132, 1134 described above.

Figure 13:
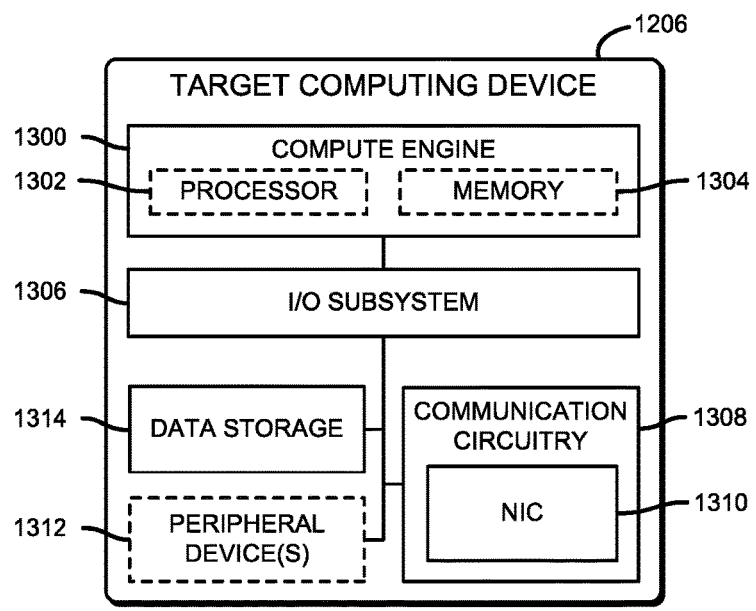
FIG. 13 is a simplified block diagram of at least one embodiment of a target computing device of the system of FIG. 12.

As shown in FIG. 13, the illustrative target computing device 1206 (e.g., a compute sled) includes a compute engine 1300, an input/output (I/O) subsystem 1306, communication circuitry 1308, a data storage device 1314, and, in some embodiments, one or more peripheral devices 1312. Of course, in other embodiments, the target computing device 1206 may include alternative or additional components, such as those commonly found in a computing device (e.g., a graphics processing unit (GPU), a power supply, fans, etc.). For example, in some embodiments, the target computing device 1206 may be embodied as an accelerator sled having one or more field programmable gate array (FPGA), a memory sled having a number of memory storage devices and associated controllers, or a data storage sled having a number of data storage devices (e.g., solid state drives) and associated controllers. Additionally, in some embodiments, one or more of the illustrative components may be incorporated in, or otherwise form a portion of, another component. Further, in some embodiments, one or more of the illustrative components may be omitted from the target computing device 1206.

The compute engine 1300 may be embodied as any type of device or collection of devices capable of performing various compute functions described below. In some embodiments, the compute engine 1300 may be embodied as a single device such as an integrated circuit, an embedded system, a field-programmable gate array (FPGA), a system-on-a-chip (SOC), or other integrated system or device. Additionally, in some embodiments, the compute engine 1300 includes or is embodied as a processor 1302 and a memory 1304. The compute engine 1300 may be embodied as any type of central processing unit capable of carrying out instructions to perform the functions described herein. For example, the processor 1302 may be embodied as a single core processor, a multi-core processor, a digital signal processor (DSP), a field programmable gate array (FPGA), a microcontroller, or other processor or processing/controlling circuit. Irrespective of the embodiment of the processor 1302, the processor 1302 may be embodied as an independent logical execution unit capable of executing programmed instructions. In some embodiments, the processor 1302 may include a portion of cache memory (i.e., memory that can be accessed more quickly than the memory 1304) and functional units usable to independently execute programs or threads, which are not shown to preserve clarity of the description. It should be appreciated that, in some embodiments, the target computing device 1206 may contain more than one processor 1302.

The memory 1304 may be embodied as any type of volatile or non-volatile memory or data storage capable of performing the functions described herein. In operation, the memory 1304 may store various data and software used during operation of the target computing device 1206, such as operating systems, applications, programs, libraries, and drivers. The I/O subsystem 1306 may be embodied as circuitry and/or components to facilitate input/output operations with the compute engine 1300 and other components of the target computing device 1206. For example, the I/O subsystem 1306 may be embodied as, or otherwise include, memory controller hubs, input/output control hubs, firmware devices, communication links (i.e., point-to-point links, bus links, wires, cables, light guides, printed circuit board traces, etc.), and/or other components and subsystems to facilitate the input/output operations. In some embodiments, the I/O subsystem 1306 may form a portion of a system-on-a-chip (SoC) and be incorporated, along with the processor 1302, the memory 1304, and other components of the target computing device 1206, on a single integrated circuit chip.

The communication circuitry 1308 may be embodied as any communication circuit, device, or collection thereof, capable of enabling communications between the target computing device 1206 and other computing devices, such as the source computing device 1202, as well as any network communication enabling devices, such as an access point, network switch/router, etc., to allow communication over the network 1204. The communication circuitry 1308 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

In some embodiments, performance of one or more of the functions of communication circuitry 1308 as described herein may be performed by specialized circuitry, hardware, or combination thereof of the communication circuitry 1308, which may be embodied as a system-on-a-chip (SoC) or otherwise form a portion of a SoC of the target computing device 1206 (e.g., incorporated on a single integrated circuit chip along with the processor 1302, the memory 1304, and/or other components of the target computing device 1206). Alternatively, in some embodiments, the specialized circuitry, hardware, or combination thereof may be embodied as one or more discrete processing units of the target computing device 1206, each of which may be capable of performing one or more of the functions described herein.

The illustrative communication circuitry 1308 includes a network interface controller (NIC) 1310. The NIC 1310 may be embodied as one or more add-in-boards, daughtercards, network interface cards, controller chips, chipsets, or other devices that may be used by the target computing device 1206. In some embodiments, for example, the NIC 1310 may be integrated with the compute engine 1300, embodied as an expansion card coupled to the I/O subsystem 1306 over an expansion bus (e.g., PCI Express (PCIe)), included as a part of a SoC that includes one or more processors, or included on a multichip package that also contains one or more processors.

It should be appreciated that, in some embodiments, the communication circuitry 1308 may include specialized circuitry, hardware, or a combination thereof to perform pipeline logic (e.g., hardware algorithms) for performing the functions described herein, including processing network packets (e.g., parse received network packets, determine destination computing devices for each received network packets, forward the network packets to a particular buffer queue of a respective host buffer of the target computing device 1206, etc.), perform computational functions, etc. For example, in some embodiments, at least a portion of the operations described herein as being performed by the counter engine 1212 may be performed by the communication circuitry 1308, or more particularly by the NIC 1310.

The data storage device 1314 may be embodied as any type of device or devices configured for short-term or long-term storage of data such as, for example, memory devices and circuits, memory cards, hard disk drives, solid-state drives, or other data storage devices. It should be appreciated that the data storage device 1314 and/or the memory 1304 (e.g., the computer-readable storage media) may store various data as described herein, including operating systems, applications, programs, libraries, drivers, instructions, etc., capable of being executed by a processor (e.g., the processor 1300) of the target computing device 1206.

The peripheral device(s) 1312 may include any type of device that is usable to input information into the target computing device 1206 and/or receive information from the target computing device 1206. The peripheral devices 1312 may be embodied as any auxiliary device usable to input information into the target computing device 1206, such as a keyboard, a mouse, a microphone, a barcode reader, an image scanner, etc. or output information from the target computing device 1206, such as a display, a speaker, graphics circuitry, a printer, a projector, etc. It should be appreciated that, in some embodiments, one or more of the peripheral devices 1312 may function as both an input device and an output device (e.g., a touchscreen display, a digitizer on top of a display screen, etc.). It should be further appreciated that the types of peripheral devices 1222 connected to the target computing device 1206 may depend on, for example, the type and/or intended use of the target computing device 1206. Additionally or alternatively, in some embodiments, the peripheral devices 1222 may include one or more ports, such as a USB port, for example, for connecting external peripheral devices to the target computing device 1206.

The network 1204 may be embodied as any type of wired or wireless communication network, including but not limited to a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. It should be appreciated that, in such embodiments, the network 1204 may serve as a centralized network and, in some embodiments, may be communicatively coupled to another network (e.g., the Internet). Accordingly, the network 1204 may include a variety of other virtual and/or physical network computing devices (e.g., routers, switches, network hubs, servers, storage devices, compute devices, etc.), as needed to facilitate communication between the source computing device 1202 and the target computing device 1206, which are not shown to preserve clarity of the description.

The source computing device 1202 may be embodied as any type of computation or computer device capable of performing the functions described herein, including, without limitation, a mobile computing device (e.g., a smartphone, a tablet computer, a laptop computer, a notebook computer, a wearable device), a desktop computer, a server (e.g., stand-alone, rack-mounted, blade, etc.), switch (e.g., a disaggregated switch, a rack-mounted switch, a standalone switch, a fully managed switch, a partially managed switch, a full-duplex switch, and/or a half-duplex communication mode enabled switch), a router, a network appliance (e.g., physical or virtual), a web appliance, a distributed computing system, a processor-based system, and/or a multiprocessor system.

It should be appreciated that the source computing device 1202 includes generally like components to that described herein for the illustrative target computing device 1206. As such, further descriptions of the like components are not repeated herein for clarity of the description with the understanding that the description of the corresponding components provided above in regard to the target computing device 1206 applies equally to the corresponding components of the source computing device 1202. For example, the source computing device 1202 may be embodied as another sled 204, 404, 504, 1004, 1130, 1132, 1134 in some embodiments. Of course, it should be appreciated that the source computing device 1202 may include additional and/or alternative components, depending on the embodiment.

Figure 14:
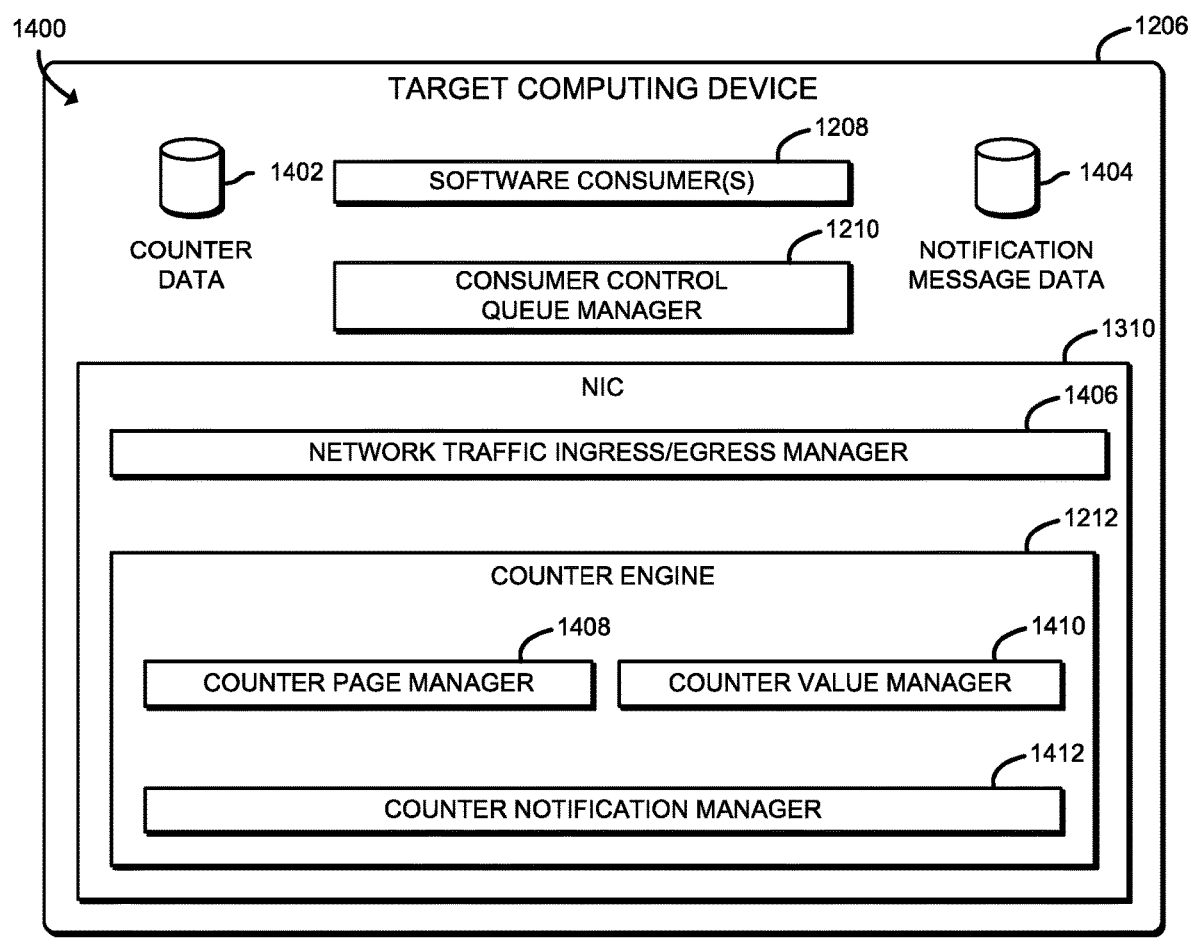
FIG. 14 is a simplified block diagram of at least one embodiment of an environment of the target computing device of FIGS. 12 and 13.

Referring now to FIG. 14, in use, the target computing device 1206 establishes an environment 1400 during operation. The illustrative environment 1400 includes a network traffic ingress/egress manager 1406, as well as the one or more software consumers 1208, the consumer control queue manager 1210, and the counter engine 1212 of the illustrative target computing device 1206 of FIG. 12. The various components of the environment 1400 may be embodied as hardware, firmware, software, or a combination thereof. As such, in some embodiments, one or more of the components of the environment 1400 may be embodied as circuitry or collection of electrical devices (e.g., a network traffic ingress/egress manager circuit 1406, a consumer control queue manager circuit 1210, a counter engine circuit 1212, etc.).

It should be appreciated that, in some embodiments, one or more of the illustrative components may form a portion of another component and/or one or more of the illustrative components may be independent of one another. Further, in some embodiments, one or more of the components of the environment 1400 may be embodied as virtualized hardware components or emulated architecture, which may be established and maintained by the processor 1300, the NIC 1310, or other component(s) of the target computing device 1206. It should be appreciated that the target computing device 1206 may include other components, sub-components, modules, sub-modules, logic, sub-logic, and/or devices commonly found in a computing device, which are not illustrated in FIG. 14 for clarity of the description.

In the illustrative environment 1400, the target computing device 1206 additionally includes counter data 1402 and notification message data 1404, each of which may be accessed by the various components and/or sub-components of the target computing device 1206. Further, each of the counter data 1402 and the notification message data 1404 may be accessed by the various illustrative components of the target computing device 1206. Additionally, it should be appreciated that in some embodiments the data stored in, or otherwise represented by, each of the counter data 1402 and the notification message data 1404 may not be mutually exclusive relative to each other. For example, in some implementations, data stored in the counter data 1402 may also be stored as a portion of one or more of the notification message data 1404. As such, although the various data utilized by the target computing device 1206 is described herein as particular discrete data, such data may be combined, aggregated, and/or otherwise form portions of a single or multiple data sets, including duplicative copies, in other embodiments.

The software consumer(s) 1208 may be embodied as any type of program being presently executed on the target computing device 1206 which maintains a master copy of the status counters and consumes (i.e., processes) counter values received in notification messages transmitted to the software consumers 1208 by the counter engine 1212 via a consumer control queue. Accordingly, the consumer control queue manager 1210, which may be embodied as hardware, firmware, software, virtualized hardware, emulated architecture, and/or a combination thereof as discussed above, is configured to function as an interface between software consumers (e.g., the software consumers 1208 of FIG. 12) and the counter engine 1212.

To do so, the consumer control queue manager 1210 is configured to create and manage a consumer control queue for each software consumer subscribed to the counter engine 1212. Each consumer control queue is configured to receive and queue the counter notification messages described herein, as well as distribute the queued counter notification messages to the associated software consumer. To initialize the consumer control queues, the consumer control queue manager 1210 is configured to initialize and allocate each consumer control queue, as well as establish a unique identifier for each consumer control queue, which is usable by the software consumer to request notification packets from the respective consumer control queue.

Additionally, the consumer control queue manager 1210 may be configured to assign an interrupt to each consumer control queue. In some embodiments, the consumer control queue manager 1210 may be configured to set the consumer control queue on a core which is not processing fast path network traffic. The consumer control queue manager 1210 may be further configured to communicate with a driver, such as may be required to set parameters of the consumer control queues, such as the number of buffers to allocate for the consumer control queues (e.g., to handle a worst-case flush rate).

The network traffic ingress/egress manager 1406, which may be embodied as hardware, firmware, software, virtualized hardware, emulated architecture, and/or a combination thereof as discussed above, is configured to receive inbound and route/transmit outbound network traffic. Accordingly, the network traffic ingress/egress manager 1406 is configured to facilitate inbound network communications (e.g., network traffic, network packets, network flows, etc.) to the target computing device 1206 by managing (e.g., create, modify, delete, etc.) connections to physical and virtual network ports (i.e., virtual network interfaces) of the target computing device 1206 (e.g., via the communication circuitry 1306), as well as the ingress buffers/queues associated therewith. Further, the network traffic ingress/egress manager 1406 is configured to parse received network packets, such as may be performed on a header or payload/body of a received network packet to identify a property or indicator of the network packet which may be usable to classify the received network packet and/or determine a flow to which the received network packet corresponds.

Additionally, the network traffic ingress/egress manager 1406 is configured to facilitate outbound network communications (e.g., network traffic, network packet streams, network flows, etc.) from the target computing device 1206 by managing (e.g., create, modify, delete, etc.) connections to physical and virtual network ports/interfaces of the target computing device 1206 (e.g., via the communication circuitry 1306), as well as the egress buffers/queues associated therewith. Further, the network traffic ingress/egress manager 1406 is configured to construct/add the appropriate headers at the applicable layers to the network packet, the payload/body (i.e., the statistic counter values and associated identifiers), and any footers, such as may be used to store error-detecting code (e.g., cyclic redundancy check (CRC) data verification information).

The counter engine 1212, which may be embodied as hardware, firmware, software, virtualized hardware, emulated architecture, and/or a combination thereof as discussed above, is configured to maintain the values of statistic counters over a period of time, package those statistic counter values to which a software consumer has subscribed into a notification message, and transmit the notification message to the subscribed software consumer. To do so, the illustrative counter engine 1212 includes a counter page manager 1408, a counter value manager 1410, and a counter notification manager 1412.

Figure 17:
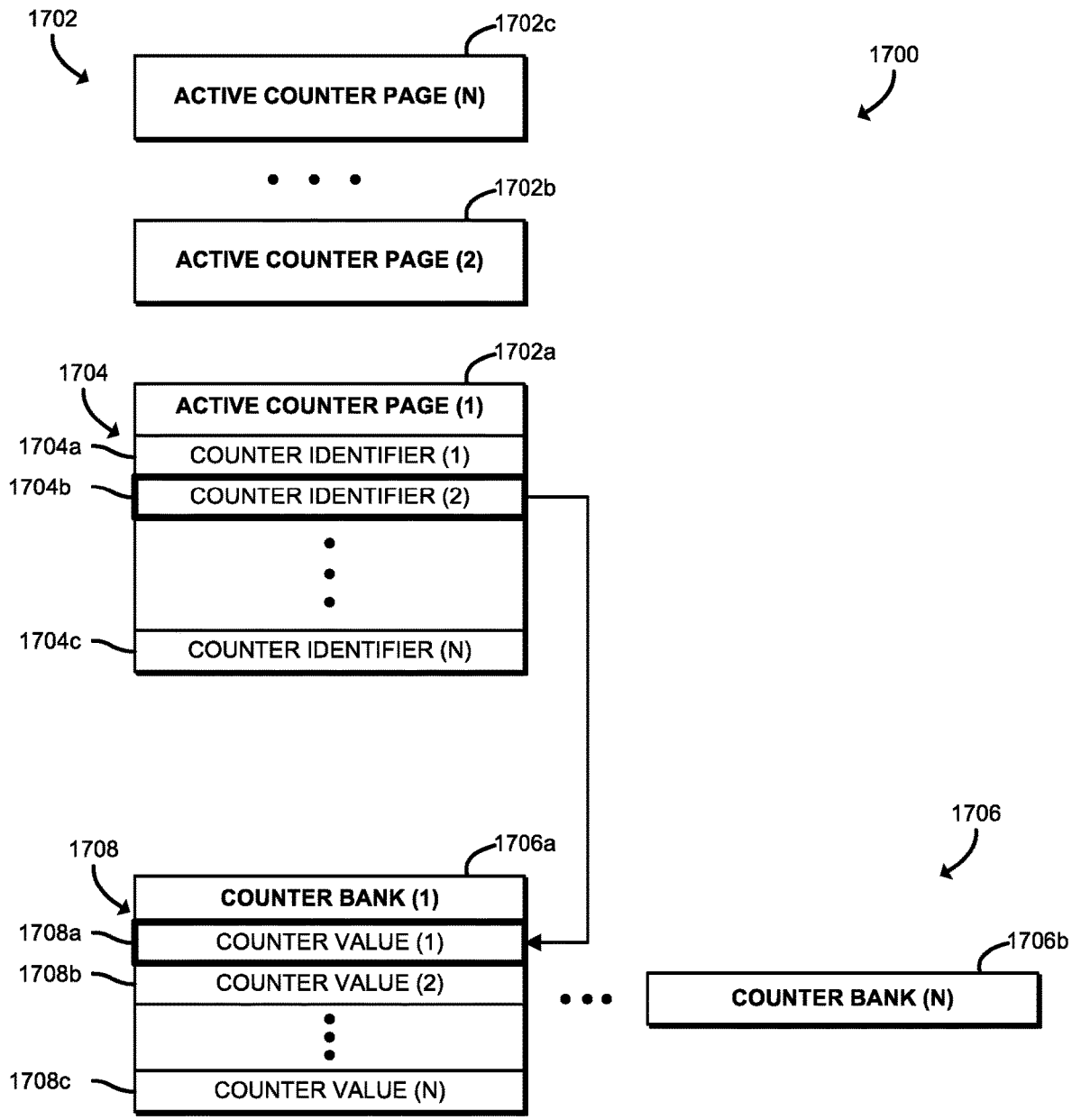
FIG. 17 is a simplified block diagram of a high-level architecture of network statistic counters in a memory of the target computing device of FIGS. 12-14 usable to perform a counter value lookup.

The counter page manager 1408, which may be embodied as hardware, firmware, software, virtualized hardware, emulated architecture, and/or a combination thereof, is configured to create and manage the active counter pages (see, e.g., the active counter pages 1702 of FIG. 17). To do so, the counter page manager 1408 is configured to allocate new active counter pages and manage which software consumer (e.g., one of the software consumers 1208 of FIG. 12) is associated with each active counter page. Each active counter page is usable to map a statistic counter identifier to a memory address entry of the value of the mapped statistic counter.

It should be appreciated that a software consumer can subscribe to more than one active counter page. Accordingly, the counter page manager 1408 may be configured to generate and provide the software consumer with an identifier of the active counter pages to which the software consumer corresponds. Alternatively, the counter page manager 1408 may be configured to receive the identifier from the software consumer and use the identifier to map the software consumer to the active counter pages to which the software consumer corresponds. In other words, the identifier, irrespective of the source, may be usable by the software consumer to identify which active counter page(s) are associated with messages (e.g., notification messages) received from the counter engine 1212.

The counter value manager 1410, which may be embodied as hardware, firmware, software, virtualized hardware, emulated architecture, and/or a combination thereof, is configured to create the statistic counters and update the statistic counter values. For example, upon receiving a network packet and identifying the packet flow associated with the received network packet (e.g., such as may be performed by the network traffic ingress/egress manager 1406), the counter value manager 1410 is configured to identify which active counter page(s) are associated with the software consumer based on the identified packet flow. It should be appreciated that, alternatively, in other embodiments, another indicator may be additionally or alternatively associated with the network packet (e.g., a type of payload data, a tuple, a source internet protocol (IP) address, a destination IP address, a source port number, a destination port number, etc.) which may be used to identify the appropriate statistic counter identifier for each received network packet.

The counter value manager 1410 is configured to perform a lookup operation to retrieve a present value of the statistic counter (i.e., a counter value) whose address is mapped to the statistic counter identifier in the identified active counter page. If the statistic counter is new (i.e., the lookup was unsuccessful), the counter value manager 1410 is configured to allocate the statistic counter in a bank of counter memory (see, e.g., the counter banks 1706 of FIG. 17) with an initial default value (e.g., zero) using the applicable counter memory entry. Additionally, the counter value manager 1410 is configured to add the statistic counter to the appropriate active counter page (i.e., associated with the software consumer which corresponds to the identified packet flow). If the statistic counter exists in the active counter page (i.e., the lookup was successful), the counter value manager 1410 is configured to use the counter memory entry address associated with the statistic counter to read the present value, increment the present value, and write the incremented value back to the counter memory.

The counter notification manager 1412, which may be embodied as hardware, firmware, software, virtualized hardware, emulated architecture, and/or a combination thereof, is configured to generate a notification message and transmit the generated notification message to the applicable consumer control queue (e.g., via the consumer control queue manager). To do so, the counter notification manager 1412 is configured to detect a notification triggering event and request the values for each statistic counter mapped to the active counter page associated with a software consumer associated with the notification triggering event. A notification triggering event may include any detected event which prompts the statistic counter values associated with an active counter page to be read. As described previously, such triggering events may include a timer having expired, a flush request from the subscribing software, the value of a statistic counter having exceeded a threshold value (e.g., based on a number of bits allocated per counter or other threshold determining factor), a statistic counter having grown by a predetermined value, or some other notification triggering event.

Upon having received the requested statistic counter values, the counter notification manager 1412 is additionally configured to generate a notification message that includes the received statistic counter values as a payload/body of the notification message. Additionally, the counter notification manager 1412 is configured to attach a header to the notification message that includes a timestamp indicative of the time at which the notification message was generated and an indication of the total number of received statistic counter values. The counter notification manager 1412 is further configured to transmit the notification message to a consumer control queue associated with the software consumer for which the notification message has been generated. Accordingly, the software consumer can update a master copy of the statistic counter values upon receipt of the notification message from the consumer control queue. In some embodiments, the master copy of the statistic counter values may be stored in the counter data 1402. Additionally, in some embodiments, at least a portion of the notification message may be stored in the notification message data 1404.

Figure 15:
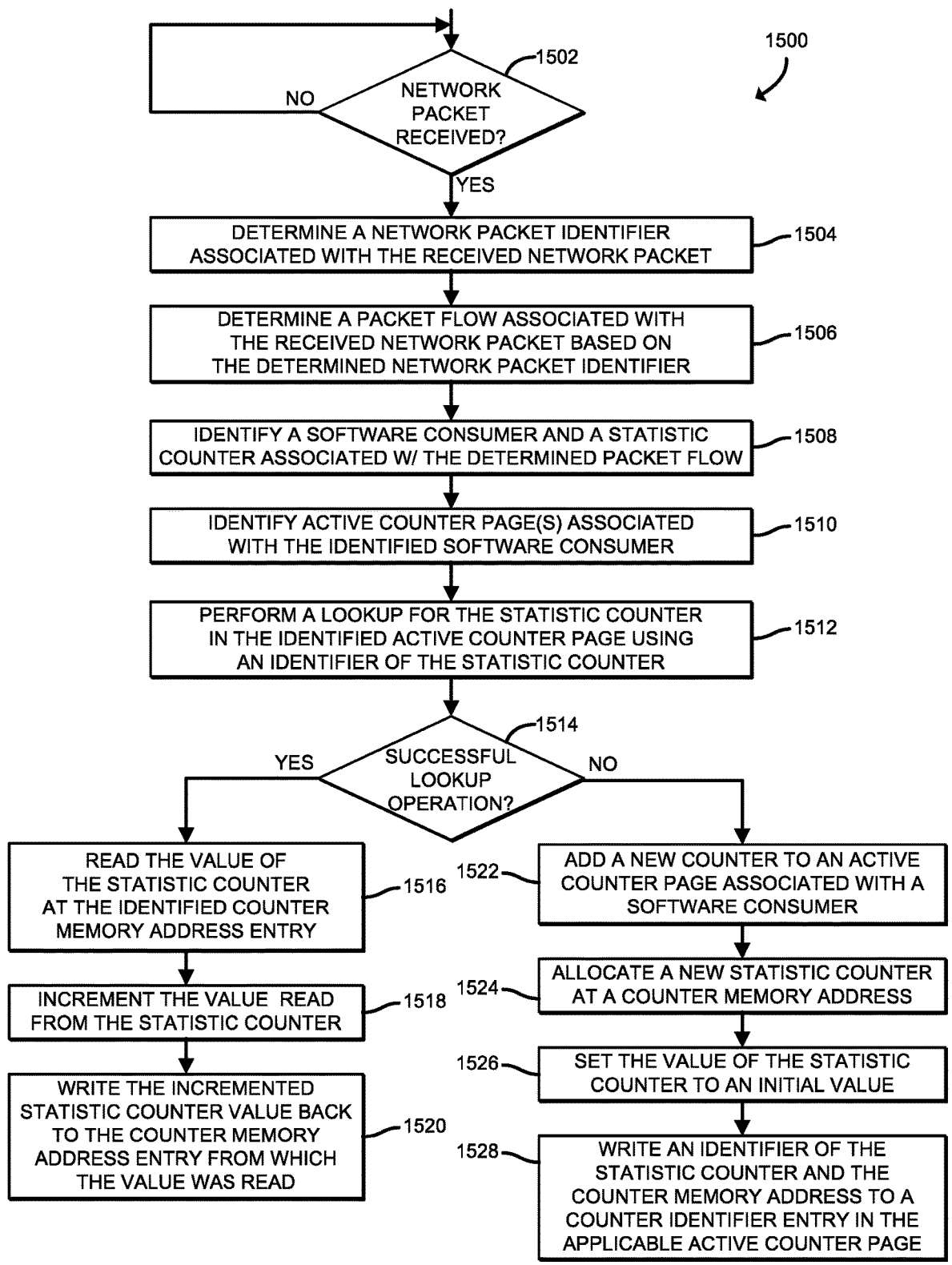
FIG. 15 is a simplified flow diagram of at least one embodiment of a method for updating a network statistic counter associated with a received network packet that may be executed by the target computing device of FIGS. 12-14.

Referring now to FIG. 15, a method 1500 for updating a network statistic counter associated with a received network packet is shown which may be executed by the target computing device 1206, or more particularly by a NIC (e.g., the NIC 1310 of FIG. 13) of the target computing device 1206. It should be appreciated that at least a portion of the functionality described in the method 1500 may be performed by the counter engine 1212. The method 1500 begins in block 1502, in which the NIC 1310 determines whether a network packet has been received. If so, the method 1500 advances to block 1504 in which the NIC 1310 determines a network packet identifier associated with the received network packet. In some embodiments, the network packet identifier may be determined upon parsing and processing at least a portion of the received network packet header and/or payload/body. In block 1506, the NIC 1310 determines a packet flow associated with the received network packet based on the determined network packet identifier.

In block 1508, the NIC 1310 identifies a software consumer and a statistic counter based on the determined packet flow. In block 1510, the NIC 1310 identifies one or more active counter pages associated with the identified software consumer. In block 1512, the NIC 1310 performs a lookup operation for the statistic counter in the identified active counter page using an identifier of the statistic counter. As described previously, the lookup operation is performed on the active counter page (i.e., using the statistic counter identifier) to retrieve a memory entry address of the statistic counter. In block 1514, the NIC 1310 determines whether the lookup operation was successful. In other words, the NIC 1310 determines whether a matching statistic counter identifier was found in the identified active counter page and a corresponding counter memory address of the statistic counter has been retrieved.

If the NIC 1310 determines the lookup operation was successful in block 1514, the method 1500 branches to block 1516. In block 1516, the NIC 1310 reads the value of the statistic counter at the statistic counter memory entry address retrieved during the lookup operation. For example, FIG. 17 displays an illustrative high-level architecture of statistic counters 1708 in a memory of the target computing device 1206. As illustratively shown the active counter pages 1702 includes a first active counter page, designated as active counter page (1) 1702a, a second active counter page, designated as active counter page (2) 1702b, and a third active counter page, designated as active counter page (N) 1702c, wherein "N" is a positive integer which represents the "Nth" active counter page 1702.

As also illustratively shown, active counter page (1) 1702a includes a first counter identifier entry, designated as counter identifier (1) 1704a, a second counter identifier entry, designated as counter identifier (2) 1704b, and a third counter identifier entry, designated as counter identifier (N) 1704c, wherein "N" is a positive integer which represents the "Nth" counter identifier entry 1704. Additionally, the illustrative counter banks 1706 include a first counter bank, designated as counter bank (1) 1706a, and second counter bank, designated as counter bank (N) 1706b, wherein "N" is a positive integer which represents the "Nth" counter bank 1706. The counter bank (1) 1706a illustratively includes a first counter value entry, designated as counter value (1) 1708a, a second counter value entry, designated as counter value (2) 1708b, and a third counter value entry, designated as counter value (N) 1708*c*, wherein "N" is a positive integer which represents the "Nth" counter value entry 1708.

In such an embodiment, to perform a lookup operation, the NIC 1310 is configured to determine whether a matching counter identifier is in a counter identifier entry 1704 of the active counter page 1702 being searched. As noted previously, each active counter page 1702 includes a set of statistic counter identifiers and their corresponding counter memory address entries, each of which correspond to a counter value entry 1708 of a counter bank 1706 in which the statistic counter values are stored. In an illustrative example in which the packet flow corresponds to a software consumer associated with the active counter page (1) 1702*a*, the NIC 1310 is configured to determine whether the active counter page (1) 1702*a* includes a statistic counter identifier in one of the counter entries 1704 which matches the counter identifier corresponding to the identified statistic counter (i.e., identified based on the determined packet flow). In furtherance of the illustrative example, upon locating a matching counter identifier, as indicated by the highlighted border of the counter identifier (2) 1704*b*, the NIC 1310 is configured to make a read request to the counter memory address of the counter identifier (2) 1704*b*, which as illustratively shown and indicated by the highlighted border and arrow is the counter value (1) 1708*a* of the counter bank (1) 1706*a*.

Referring again to FIG. 15, in block 1518, the NIC 1310 increments the value read from the statistic counter. In block 1520, the NIC 1310 writes the incremented statistic counter value back to the counter memory address from which the statistic counter value was initially read. Referring back to block 1514, in the event the NIC 1310 determines the lookup operation was not successful, the method 1500 branches to block 1522. In block 1522, the NIC 1310 adds a new counter to an active counter page associated with the identified software consumer. In block 1524, the NIC 1310 allocates a new statistic counter at a counter memory address. In block 1526, the NIC 1310 initializes a value of the new statistic counter to a default initial value (e.g., zero). In block 1528, the NIC 1310 writes an identifier of the statistic counter and the counter memory address to a counter identifier entry (e.g., one of the counter identifier entries 1704 of FIG. 17) in the applicable active counter page (e.g., one of the active counter pages 1702 of FIG. 17).

Figure 16:
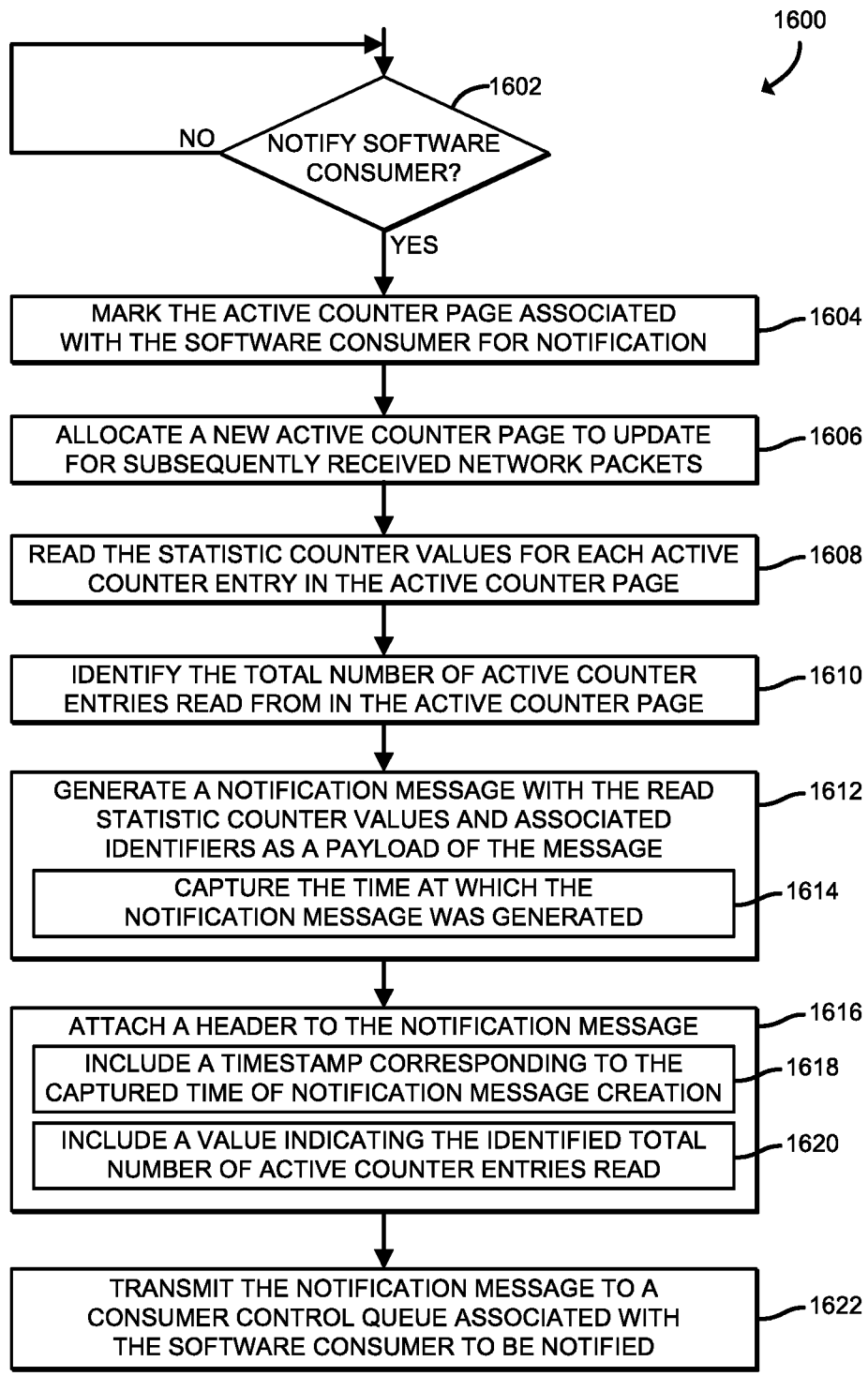
FIG. 16 is a simplified flow diagram of at least one embodiment of a method for notifying a software consumer of the present values of one or more network statistic counter(s) to which the software consumer has subscribed that may be executed by the target computing device of FIGS. 12-14.

Referring now to FIG. 16, a method 1600 for notifying a software consumer of the present values of one or more network statistic counter(s) to which the software consumer has subscribed is shown which may be executed by the target computing device 1206, or more particularly by a NIC (e.g., the NIC 1310 of FIG. 13) of the target computing device 1206. It should be appreciated that at least a portion of the functionality described in the method 1600 may be performed by the counter engine 1212. The method 1600 begins in block 1602, in which the NIC 1310 determines whether a notification triggering event has been detected which indicates to notify a software consumer (e.g., one of the software consumers 1208 of FIG. 12) of the present statistic counter values of a particular active counter page. As described previously, a notification triggering event may include any detected event which prompts the statistic counter values associated with an active counter page to be read. As also described previously, such triggering events may include a timer having expired, a flush request from the subscribing software, the value of a statistic counter having exceeded a threshold value (e.g., based on a number of bits allocated per counter or other threshold determining factor), a statistic counter having grown by a predetermined value, or some other notification triggering event.

If the NIC 1310 determines to notify the software consumer, the method 1600 advances to block 1604, in which the NIC 1310 marks the active counter page associated with the software consumer for notification. In block 1606, the NIC 1310 allocates a new active counter page to update for subsequently received network packets. It should be appreciated that the new active counter page includes the same active counter entries as the active counter page marked for notification such that each counter is reset to the default value. As such, only the number of successful lookups performed between the time the active counter page was marked for notification and the new active counter page is marked for notification are accounted for. In block 1608, the NIC 1310 reads the statistic counter values for each active counter entry in the active counter page. In block 1610, the NIC 1310 identifies the total number of active counter entries read from the active counter page. In block 1612, the NIC 1310 generates a notification message with the read statistic counter values and their associated statistic counter identifiers as a payload/body of the message. Additionally, in block 1614, the NIC 1310 captures the time at which the notification message was generated.

In block 1616, the NIC 1310 attaches a header to the notification message. Additionally, in block 1618, the NIC 1310 includes a timestamp in the header which corresponds to the captured time at which the notification message was generated. Further, in block 1620, the NIC 1310 includes a value indicating the identified total number of active counter entries in the active counter page. In block 1622, the NIC 1310 transmits the notification message to a consumer control queue associated with the software consumer to be notified.

It should be appreciated that, in some embodiments, the methods 1500 and 1600 may be embodied as various instructions stored on a computer-readable media, which may be executed by a processor (e.g., the processor 1300), the communication circuitry 1306, and/or other components of the target computing device 1206 to cause the target computing device 1206 to perform at least a portion of the methods 1500 and 1600. The computer-readable media may be embodied as any type of media capable of being read by the target computing device 1206 including, but not limited to, the memory 1304, the data storage device 1314, other memory or data storage devices of the target computing device 1206, portable media readable by a peripheral device of the target computing device 1206, and/or other media.

EXAMPLES

Illustrative examples of the technologies disclosed herein are provided below. An embodiment of the technologies may include any one or more, and any combination of, the examples described below.

Example 1 includes a computing device for managing network statistic counters, the computing device comprising a compute engine; and a network interface controller (NIC) to identify, by the NIC, a statistic counter of a plurality of statistic counters and a software consumer based on a received network packet, wherein the software consumer is presently executing on the computing device; identify, by the NIC, an active counter page as a function of the identified software consumer, wherein the active counter page includes a plurality of counter identifier entries, and wherein each of the plurality of counter identifier entries includes a counter identifier of the statistic counter and a counter memory address of the statistic counter; read, by the NIC, a value of the statistic counter stored at the counter memory address of a corresponding counter identifier entry; increment, by the NIC, the read value of the statistic counter; write, by the NIC, the incremented value of the statistic counter back to the counter memory address; determine, by the NIC, whether a notification triggering event has been detected; generate, by the NIC and in response to having detected the notification triggering event, a notification message, wherein a body of the notification message includes a present value of the statistic counter and a present value of each of the other statistic counters of the active counter page; and transmit, by the NIC, the generated notification message to the software consumer.

Example 2 includes the subject matter of Example 1, and wherein to transmit the generated notification message to the software consumer comprises to transmit the generated notification message to a consumer control queue associated with the software consumer.

Example 3 includes the subject matter of any of Examples 1 and 2, and wherein to generate the notification message includes to capture a time at which the notification message was generated and attach a header to the notification message, and wherein the header includes the captured time.

Example 4 includes the subject matter of any of Examples 1-3, and wherein to generate the notification message includes to attach a header to the notification message, wherein the header includes an indicator of a total number of statistic counters of the active counter page included in the notification message.

Example 5 includes the subject matter of any of Examples 1-4, and wherein to determine whether the notification triggering event has been detected comprises to detect whether a timer managed by the NIC has expired.

Example 6 includes the subject matter of any of Examples 1-5, and wherein to determine whether the notification triggering event has been detected comprises to detect whether a flush request has been received from the software consumer.

Example 7 includes the subject matter of any of Examples 1-6, and wherein to determine whether the notification triggering event has been detected comprises to detect whether a value of any of the plurality of statistic counters has exceeded a threshold value.

Example 8 includes the subject matter of any of Examples 1-7, and wherein to determine whether the notification triggering event has been detected comprises to detect whether a value of any of the plurality of statistic counters has grown by a predetermined value.

Example 9 includes the subject matter of any of Examples 1-8, and wherein the plurality of instructions further cause the computing device to add, by the NIC and in response to the lookup operation not having returned a matching counter identifier, a new counter to the active counter page; allocate, by the NIC, a new statistic counter at a new counter memory address; set, by the NIC, a value of the new statistic counter to zero; and write, by the NIC, an identifier of the new statistic counter and the new counter memory address to an empty counter identifier entry of the active counter page.

Example 10 includes the subject matter of any of Examples 1-9, and wherein the plurality of instructions further cause the computing device to determine, by the NIC, a packet flow associated with the received network packet, and wherein to identify the statistic counter and the software consumer comprises to identify the statistic counter and the software consumer based on the determined packet flow.

Example 11 includes the subject matter of any of Examples 1-10, and wherein the plurality of instructions further cause the computing device to perform, by the NIC, a lookup operation for the identified statistic counter in the identified active counter page to retrieve a counter memory address associated with the identified statistic counter, and wherein to read the value of the statistic counter stored at the counter memory address of the corresponding counter identifier entry comprises to read the value of the statistic counter at a matching counter identifier entry returned by the lookup operation subsequent to the lookup operation having returned the matching counter identifier entry.

Example 12 includes a method for managing network statistic counters, the method comprising identifying, by a network interface controller (NIC) of a computing device, a statistic counter of a plurality of statistic counters and a software consumer based on a received network packet, wherein the software consumer is presently executing on the computing device; identifying, by the NIC, an active counter page as a function of the identified software consumer, wherein the active counter page includes a plurality of counter identifier entries, and wherein each of the plurality of counter identifier entries includes a counter identifier of the statistic counter and a counter memory address of the statistic counter; reading, by the NIC, a value of the statistic counter stored at the counter memory address of a corresponding counter identifier entry; incrementing, by the NIC, the read value of the statistic counter; writing, by the NIC, the incremented value of the statistic counter back to the counter memory address; determining, by the NIC, whether a notification triggering event has been detected; generating, by the NIC and in response to having detected the notification triggering event, a notification message, wherein a body of the notification message includes a present value of the statistic counter and a present value of each of the other statistic counters of the active counter page; and transmitting, by the NIC, the generated notification message to the software consumer.

Example 13 includes the subject matter of Example 12, and wherein transmitting the generated notification message to the software consumer comprises transmitting the generated notification message to a consumer control queue associated with the software consumer.

Example 14 includes the subject matter of any of Examples 12 and 13, and wherein generating the notification message includes capturing a time at which the notification message was generated and attach a header to the notification message, and wherein the header includes the captured time.

Example 15 includes the subject matter of any of Examples 12-14, and wherein generating the notification message includes attaching a header to the notification message, and wherein the header includes an indicator of a total number of statistic counters of the active counter page included in the notification message.

Example 16 includes the subject matter of any of Examples 12-15, and wherein determining whether the notification triggering event has been detected comprises detecting whether a timer managed by the NIC has expired.

Example 17 includes the subject matter of any of Examples 12-16, and wherein determining whether the notification triggering event has been detected comprises detecting whether a flush request has been received from the software consumer.

Example 18 includes the subject matter of any of Examples 12-17, and wherein determining whether the notification triggering event has been detected comprises detecting whether a value of any of the plurality of statistic counters has exceeded a threshold value.

Example 19 includes the subject matter of any of Examples 12-18, and wherein determining whether the notification triggering event has been detected comprises detecting whether a value of any of the plurality of statistic counters has grown by a predetermined value.

Example 20 includes the subject matter of any of Examples 12-19, and further including adding, by the NIC and in response to the lookup operation not having returned a matching counter identifier, a new counter to the active counter page; allocating, by the NIC, a new statistic counter at a new counter memory address; setting, by the NIC, a value of the new statistic counter to zero; and writing, by the NIC, an identifier of the new statistic counter and the new counter memory address to an empty counter identifier entry of the active counter page.

Example 21 includes the subject matter of any of Examples 12-20, and further including determining, by the NIC, a packet flow associated with the received network packet, and wherein identifying the statistic counter and the software consumer comprises identifying the statistic counter and the software consumer based on the determined packet flow.

Example 22 includes the subject matter of any of Examples 12-21, and further including performing, by the NIC, a lookup operation for the identified statistic counter in the identified active counter page to retrieve a counter memory address associated with the identified statistic counter, and wherein reading the value of the statistic counter stored at the counter memory address of the corresponding counter identifier entry comprises reading the value of the statistic counter at a matching counter identifier entry returned by the lookup operation subsequent to the lookup operation having returned the matching counter identifier entry.

Example 23 includes one or more machine-readable storage media of a network interface controller (NIC) of a computing device comprising a plurality of instructions stored thereon that, when executed, cause the NIC of to perform the method of any of Examples 12-22.

Example 24 includes a computing device for managing network statistic counters, the computing device comprising one or more processors; and a network interface controller (NIC) having stored therein a plurality of instructions that, when executed by the NIC, cause the computing device to perform the method of any of Examples 12-22.

Example 25 includes a computing device for managing network statistic counters, the computing device comprising means for identifying, by a network interface controller (NIC) of a computing device, a statistic counter of a plurality of statistic counters and a software consumer based on a received network packet, wherein the software consumer is presently executing on the computing device; means for identifying, by the NIC, an active counter page as a function of the identified software consumer, wherein the active counter page includes a plurality of counter identifier entries, and wherein each of the plurality of counter identifier entries includes a counter identifier of the statistic counter and a counter memory address of the statistic counter; means for reading, by the NIC, a value of the statistic counter stored at the counter memory address of a corresponding counter identifier entry; means for incrementing, by the NIC, the read value of the statistic counter; means for writing, by the NIC, the incremented value of the statistic counter back to the counter memory address; means for determining, by the NIC, whether a notification triggering event has been detected; means for generating, by the NIC and in response to having detected the notification triggering event, a notification message, wherein a body of the notification message includes a present value of the statistic counter and a present value of each of the other statistic counters of the active counter page; and means for transmitting, by the NIC, the generated notification message to the software consumer.

Example 26 includes the subject matter of Example 25, and wherein the means for transmitting the generated notification message to the software consumer comprises means for transmitting the generated notification message to a consumer control queue associated with the software consumer.

Example 27 includes the subject matter of any of Examples 25 and 26, and wherein the means for generating the notification message includes means for capturing a time at which the notification message was generated and attach a header to the notification message, and wherein the header includes the captured time.

Example 28 includes the subject matter of any of Examples 25-27, and wherein the means for generating the notification message includes means for attaching a header to the notification message, and wherein the header includes an indicator of a total number of statistic counters of the active counter page included in the notification message.

Example 29 includes the subject matter of any of Examples 25-28, and wherein the means for determining whether the notification triggering event has been detected comprises means for detecting whether a timer managed by the NIC has expired.

Example 30 includes the subject matter of any of Examples 25-29, and wherein the means for determining whether the notification triggering event has been detected comprises means for detecting whether a flush request has been received from the software consumer.

Example 31 includes the subject matter of any of Examples 25-30, and wherein the means for determining whether the notification triggering event has been detected comprises means for detecting whether a value of any of the plurality of statistic counters has exceeded a threshold value.

Example 32 includes the subject matter of any of Examples 25-31, and wherein the means for determining whether the notification triggering event has been detected comprises means for detecting whether a value of any of the plurality of statistic counters has grown by a predetermined value.

Example 33 includes the subject matter of any of Examples 25-32, and further including means for adding, by the NIC and in response to the lookup operation not having returned a matching counter identifier, a new counter to the active counter page; means for allocating, by the NIC, a new statistic counter at a new counter memory address; means for setting, by the NIC, a value of the new statistic counter to zero; and means for writing, by the NIC, an identifier of the new statistic counter and the new counter memory address to an empty counter identifier entry of the active counter page.

Example 34 includes the subject matter of any of Examples 25-33, and further including means for determining, by the NIC, a packet flow associated with the received network packet, and wherein the means for identifying the statistic counter and the software consumer comprises identifying the statistic counter and the software consumer based on the determined packet flow.

Example 35 includes the subject matter of any of Examples 25-34, and further including means for performing, by the NIC, a lookup operation for the identified statistic counter in the identified active counter page to retrieve a counter memory address associated with the identified statistic counter, and wherein the means for reading the value of the statistic counter stored at the counter memory address of the corresponding counter identifier entry comprises reading the value of the statistic counter at a matching counter identifier entry returned by the lookup operation subsequent to the lookup operation having returned the matching counter identifier entry.

The invention claimed is:

1. A computing device for managing network statistic counters, the computing device comprising:
 a hardware compute engine; and
 a network interface controller (NIC) to:
  identify, by the NIC, a statistic counter of a plurality of statistic counters and a software consumer based on a received network packet, wherein the software consumer is presently executing on the computing device;
  identify, by the NIC, an active counter page as a function of the identified software consumer, wherein the active counter page includes a plurality of counter identifier entries, and wherein each of the plurality of counter identifier entries includes a counter identifier of the statistic counter and a counter memory address of the statistic counter;
  read, by the NIC, a value of the statistic counter stored at the counter memory address of a corresponding counter identifier entry;
  increment, by the NIC, the read value of the statistic counter;
  write, by the NIC, the incremented value of the statistic counter back to the counter memory address;
  determine, by the NIC, whether a notification triggering event has been detected;
  generate, by the NIC and in response to having detected the notification triggering event, a notification message, wherein a body of the notification message includes a present value of the statistic counter and a present value of each of the other statistic counters of the active counter page; and
  transmit, by the NIC, the generated notification message to the software consumer.

2. The computing device of claim 1, wherein to transmit the generated notification message to the software consumer comprises to transmit the generated notification message to a consumer control queue associated with the software consumer.

3. The computing device of claim 1, wherein to generate the notification message includes to capture a time at which the notification message was generated and attach a header to the notification message, and wherein the header includes the captured time.

4. The computing device of claim 3, wherein to generate the notification message includes to attach a header to the notification message, wherein the header includes an indicator of a total number of statistic counters of the active counter page included in the notification message.

5. The computing device of claim 1, wherein to determine whether the notification triggering event has been detected comprises to detect whether a timer managed by the NIC has expired.

6. The computing device of claim 1, wherein to determine whether the notification triggering event has been detected comprises to detect whether a flush request has been received from the software consumer.

7. The computing device of claim 1, wherein to determine whether the notification triggering event has been detected comprises to detect whether a value of any of the plurality of statistic counters has exceeded a threshold value.

8. The computing device of claim 1, wherein to determine whether the notification triggering event has been detected comprises to detect whether a value of any of the plurality of statistic counters has grown by a predetermined value.

9. The computing device of claim 1, wherein the plurality of instructions further cause the computing device to:
 add, by the NIC and in response to the lookup operation not having returned a matching counter identifier, a new counter to the active counter page;
 allocate, by the NIC, a new statistic counter at a new counter memory address;
 set, by the NIC, a value of the new statistic counter to zero; and
 write, by the NIC, an identifier of the new statistic counter and the new counter memory address to an empty counter identifier entry of the active counter page.

10. The computing device of claim 1, wherein the plurality of instructions further cause the computing device to determine, by the NIC, a packet flow associated with the received network packet, and wherein to identify the statistic counter and the software consumer comprises to identify the statistic counter and the software consumer based on the determined packet flow.

11. The computing device of claim 1, wherein the plurality of instructions further cause the computing device to perform, by the NIC, a lookup operation for the identified statistic counter in the identified active counter page to retrieve a counter memory address associated with the identified statistic counter, and wherein to read the value of the statistic counter stored at the counter memory address of the corresponding counter identifier entry comprises to read the value of the statistic counter at a matching counter identifier entry returned by the lookup operation subsequent to the lookup operation having returned the matching counter identifier entry.

12. One or more non-transitory machine-readable storage media comprising a plurality of instructions stored thereon that, in response to being executed, cause a computing device to:
 identify, by a network interface controller (NIC) of the computing device, a statistic counter of a plurality of statistic counters and a software consumer based on a received network packet, wherein the software consumer is presently executing on the computing device;
 identify, by the NIC, an active counter page as a function of the identified software consumer, wherein the active counter page includes a plurality of counter identifier entries, and wherein each of the plurality of counter identifier entries includes a counter identifier of the statistic counter and a counter memory address of the statistic counter;
 read, by the NIC, a value of the statistic counter stored at the counter memory address of a corresponding counter identifier entry;
 increment, by the NIC, the read value of the statistic counter;
 write, by the NIC, the incremented value of the statistic counter back to the counter memory address;
 determine, by the NIC, whether a notification triggering event has been detected;
 generate, by the NIC and in response to having detected the notification triggering event, a notification message, wherein a body of the notification message includes a present value of the statistic counter and a present value of each of the other statistic counters of the active counter page; and transmit, by the NIC, the generated notification message to the software consumer.

13. The one or more non-transitory machine-readable storage media of claim 12, wherein to transmit the generated notification message to the software consumer comprises to transmit the generated notification message to a consumer control queue associated with the software consumer.

14. The one or more non-transitory machine-readable storage media of claim 12, wherein to generate the notification message includes to capture a time at which the notification message was generated and attach a header to the notification message, and wherein the header includes the captured time.

15. The one or more non-transitory machine-readable storage media of claim 14, wherein to generate the notification message includes to attach a header to the notification message, wherein the header includes an indicator of a total number of statistic counters of the active counter page included in the notification message.

16. The one or more non-transitory machine-readable storage media of claim 12, wherein to determine whether the notification triggering event has been detected comprises to detect whether a timer managed by the NIC has expired.

17. The one or more non-transitory machine-readable storage media of claim 12, wherein to determine whether the notification triggering event has been detected comprises to detect whether a flush request has been received from the software consumer.

18. The one or more non-transitory machine-readable storage media of claim 12, wherein to determine whether the notification triggering event has been detected comprises to detect whether a value of any of the plurality of statistic counters has one of exceeded a threshold value or grown by a predetermined value.

19. The one or more non-transitory machine-readable storage media of claim 12, wherein the plurality of instructions further cause the computing device to:
add, by the NIC and in response to the lookup operation not having returned a matching counter identifier, a new counter to the active counter page;
allocate, by the NIC, a new statistic counter at a new counter memory address;
set, by the NIC, a value of the new statistic counter to zero; and
write, by the NIC, an identifier of the new statistic counter and the new counter memory address to an empty counter identifier entry of the active counter page.

20. The one or more non-transitory machine-readable storage media of claim 12, wherein the plurality of instructions further cause the computing device to determine, by the NIC, a packet flow associated with the received network packet, and wherein to identify the statistic counter and the software consumer comprises to identify the statistic counter and the software consumer based on the determined packet flow.

21. The one or more non-transitory machine-readable storage media of claim 12, wherein the plurality of instructions further cause the computing device to perform, by the NIC, a lookup operation for the identified statistic counter in the identified active counter page to retrieve a counter memory address associated with the identified statistic counter, and wherein to read the value of the statistic counter stored at the counter memory address of the corresponding counter identifier entry comprises to read the value of the statistic counter at a matching counter identifier entry returned by the lookup operation subsequent to the lookup operation having returned the matching counter identifier entry.

22. A method for managing network statistic counters, the method comprising:
identifying, by a network interface controller (NIC) of a computing device, a statistic counter of a plurality of statistic counters and a software consumer based on a received network packet, wherein the software consumer is presently executing on the computing device;
identifying, by the NIC, an active counter page as a function of the identified software consumer, wherein the active counter page includes a plurality of counter identifier entries, and wherein each of the plurality of counter identifier entries includes a counter identifier of the statistic counter and a counter memory address of the statistic counter;
reading, by the NIC, a value of the statistic counter stored at the counter memory address of a corresponding counter identifier entry;
incrementing, by the NIC, the read value of the statistic counter;
writing, by the NIC, the incremented value of the statistic counter back to the counter memory address;
determining, by the NIC, whether a notification triggering event has been detected;
generating, by the NIC and in response to having detected the notification triggering event, a notification message, wherein a body of the notification message includes a present value of the statistic counter and a present value of each of the other statistic counters of the active counter page; and
transmitting, by the NIC, the generated notification message to the software consumer.

23. The method of claim 22, further comprising:
adding, by the NIC and in response to the lookup operation not having returned a matching counter identifier, a new counter to the active counter page;
allocating, by the NIC, a new statistic counter at a new counter memory address;
setting, by the NIC, a value of the new statistic counter to zero; and
writing, by the NIC, an identifier of the new statistic counter and the new counter memory address to an empty counter identifier entry of the active counter page.

24. The method of claim 22, further comprising determining, by the NIC, a packet flow associated with the received network packet, and wherein identifying the statistic counter and the software consumer comprises identifying the statistic counter and the software consumer based on the determined packet flow.

25. The method of claim 22, further comprising performing, by the NIC, a lookup operation for the identified statistic counter in the identified active counter page to retrieve a counter memory address associated with the identified statistic counter, and wherein reading the value of the statistic counter stored at the counter memory address of the corresponding counter identifier entry comprises reading the value of the statistic counter at a matching counter identifier entry returned by the lookup operation subsequent to the lookup operation having returned the matching counter identifier entry.

* * * * *